United States Patent [19]

Yamada

[11] Patent Number: 4,904,430

[45] Date of Patent: Feb. 27, 1990

[54] METHOD AND AN APPARATUS FOR BACKING UP VEHICLE MAT

[75] Inventor: Kohei Yamada, Hashima, Japan

[73] Assignee: Daiwa Company, Ltd., Gifu, Japan

[21] Appl. No.: 106,529

[22] Filed: Oct. 7, 1987

[30] Foreign Application Priority Data

| Oct. 12, 1986 | [JP] | Japan | 61-241721 |
| Oct. 30, 1986 | [JP] | Japan | 61-259426 |
| Nov. 15, 1986 | [JP] | Japan | 61-272667 |
| Nov. 21, 1986 | [JP] | Japan | 61-279255 |

[51] Int. Cl.⁴ .................... B27N 3/10; B28B 19/00
[52] U.S. Cl. ................... 264/102; 264/257; 264/259; 425/126.1; 425/127; 425/261; 425/388; 425/420
[58] Field of Search ............ 264/102, 257, 259; 425/90, 99, 110, 111, 116, 117, 126.1, 127, 259, 261, 388, 405.1, 420

[56] References Cited

U.S. PATENT DOCUMENTS

| 2,282,876 | 5/1942 | Newman | 264/257 |
| 3,098,262 | 7/1963 | Wisotzky | 264/102 |
| 3,471,601 | 10/1969 | Goetgheluck | 425/405.1 |
| 3,529,320 | 9/1970 | Kerns et al. | 425/117 |
| 3,942,926 | 3/1976 | Bulloch, Jr. | 425/126.1 |
| 3,957,408 | 5/1976 | Clymer et al. | 425/261 |
| 4,234,373 | 11/1980 | Reavill et al. | 425/405.1 |
| 4,373,885 | 2/1983 | Smyth | 425/129.1 |
| 4,491,556 | 1/1985 | Fujii et al. | 264/243 |
| 4,562,033 | 12/1985 | Johnson et al. | 264/102 |
| 4,576,560 | 3/1986 | Herman | 425/126.1 |

FOREIGN PATENT DOCUMENTS

| 55-154144 | 12/1980 | Japan | 264/257 |

Primary Examiner—Jay H. Woo
Assistant Examiner—C. Scott Bushey
Attorney, Agent, or Firm—Lorusso & Loud

[57] ABSTRACT

A method for backing up vehicle mat comprising the steps of: applying the sol resin to a metal mold which is capable of being heated or cooled; filling the resin applied to the metal mold by degasificating the air in the resin applied to the metal mold; heating the bottom surface of the metal mold to obtain semi-gel condition of the resin; pressurizing the semi-gel resin with the fabric mat by pulling four corners of the fabric mat to exert tension stress over the entire surface of the fabric mat; cooling the bottom surface of the metal mold to obtain complete rubber like gel condition of resin after heat is applied directly to the bottom surface of the metal mold so that resin is completely bonded to the fabric mat; and removing the vehicle mat finished to be backed up from the metal mold.

The apparatus for backing up vehicle mat according to the above-mentioned method eliminates the problems of crease formation on the resin surface, and peel off of the fabric mat from the base cloth made of material such as synthetic resin.

4 Claims, 32 Drawing Sheets

4,904,430

METHOD AND AN APPARATUS FOR BACKING UP VEHICLE MAT

FIELD OF THE INVENTION

1. Technological Field

This invention relates to a method and an apparatus for backing up vehicle mat, and in particular to a method and an apparatus for backing up mat fabrics by a material such as rubber.

2. Prior Art

Conventionally, it is proposed a method for backing up a mat in which one synthetic resin seat composed of fabric mat and adhesive agent attached onto the rear surface thereof is sealed up with another synthetic resin seat composed as same. However, the fabric mat which is backed up according to this method tends to be deflected due to temperature change, since this method uses an adhesive agent whose material is different either from the fabric mat and the synthetic resin seat for bonding the fabric mat with synthetic resin seat.

Another backing up method which is disclosed in the Japanese Examined Publication No. 56-37047 adopts a structure as shown in FIGS. 43 and 44, in which synthetic resin applied to the metal mold (2) by means of the resin apply device (6) is heated by a heater (3) provided at the lower portion of a truck (5) for obtaining semi-gel condition of the resin. A fabric mat (9) is applied to the semi-gel resin for cooling the semi-gel resin deposited on a fabric mat (9) by a cooling device (8), while a pressurizing device pressurizes the fabric mat to bond with the semi-gel resin to change the resin from semi-gel to sol condition in the manner that the fabric mat (9) does not suffer heat.

Another backing up apparatus, disclosed in the Examined Publication No. 56-3707, apparatus adopts the structure as shown in FIGS. 43 and 44, in which a plurality of trucks, each of which has a metal mold (2) on the upper surface (3) thereof, are arranged on a circular rail (4) so that each truck (5) moves continuously on the circular rail (4), while plastic sol feeding device (6) and a cooling device (8) are provided at the predetermined locations respectively along the circular rail (4).

The above-mentioned backing up method according to the prior art solves a problem of mat deflection by pressure bonding the resin with the fabric mat in the manner that the synthetic resin in the sol condition is heated by the metal mold heater from the downward direction to change the condition of synthetic resin from the semi-gel condition to the gel condition, while cooling or applying pressure for pressure bonding the fabric mat with semi-gel resin. However, the problems of mat pealing from the resin or crack formation appearing on the resin, remain due to air mingled in the resin, in spite of the fact that the fabric mat is backed up by the synthetic resin in the process of the above-mentioned method.

A plurality of tapered small holes are perforated on the rear surface of the vehicle mat for providing slipproof protrusions thereon. However such air mingled in the synthetic resin disturbs arcurate formation of the protrusions. Accordingly, the vehicle mat of the prior art cannot perfectly prevent of mat slipping.

Adoption of this prior backing up method utilizing pressure bonding causes crease formation on the rear surface of the mat and creases formed such as above result in the peeling off of the fabric mat from the backing up material such as synthetic resin, since the fabric mat is merely pressurized to bond with the semi-gel resin.

In the backing up apparatus according to the prior art, a plastic sol supply device, a pressurizing device, and a metal mold cooler are provided on the predetermined locations along the truck rail, on which trucks move intermittently for backing up the fabric mat. However, it suffers two deffects, i.e., one defect is that a worker has to perform the operation of setting this fabric mat onto the sol-condition plastic and removing the finished vehicle mat from the metal mold on the truck. Another defect is that the operations, particularly the placement of the fabric mat onto the plastic, are complicated and must be performed very carefully.

Still another defect of the backing up apparatus is that the transportation of each truck has to be performed manually by a worker within a predetermined time period. In addition to the manual transportation of trucks which is so troublesome, this prior art produces inferior goods due to insufficient pressurizing power for depositing the fabric mat on plastic sol and insufficient heat applied to change plastic sol in gel condition.

Furthermore, a defect of the backing up apparatus according to the prior art is that the prior art apparatus requires a sufficiently large space for installation, since the trucks are transported along the circular rail in the factory for backing up this fabric mat occupy substantially larger space. In the backing up apparatus according to the prior art, a plastic sol supply device, a pressurizing device, and a cooling device are provided respectively in the predetermined locations, while trucks on which metal molds are mounted move intermittently on the rail. The prior art having a structure as above is required to increase the number of the trucks provided on the rail, when the productivity is evaluated. However, the number of trucks capable of being accomodated on the rail is limited. Therefore, the number of mats capable of being produced per unit time is limited.

To increase the number of trucks capable of being accomodated on the circular rail, it is necessary to install a larger diameter of circular rail in the factory. Accordingly, the prior art having a structure as above requires larger space for installation.

SUMMARY OF THE INVENTION

This invention overcomes the defects of the prior art as mentioned above. It provides a method for backing up vehicle mat comprising the steps of: applying sol resin to the metal mold which is capable of being heated and cooled; filling the synthetic resin applied to the mold by degasificating air in the synthetic resin applied to the metal mold; heating the bottom surface of the metal mold to obtain the semi-gel condition of the resin; pressurizing the semi-gel resin to bond with the fabric mat by pulling four corners of the fabric mat to exert tension stress over the fabric mat; cooling the bottom surface of the metal mold to obtain complete rubber like gel condition of resin after heat is applied directly to the bottom surface of the metal mold; and removing the vehicle mat from the metal mold.

In a first embodiment of the invention an apparatus for backing up vehicle mat comprises: a turn table on which a plurality of detachable metal molds are mounted; a resin apply device for applying the resin to the metal mold; a degasificater for filling the applied resin to the metal mold; a metal mold heater provided substantially below the turn table for heating the metal mold; a fabric mat supply device movable over the metal mold. The fabric mat is pressure bonded with the resin by pulling four corners of the fabric mat to exert tension stress to the entire surface of the fabric mat; a metal mold cooler provided substantially below the turn table for cooling the metal mold; and a removing device for removing the finished fabric mat from the metal mold.

In a second embodiment of the present invention is an apparatus for backing up a vehicle mat comprises: a metal mold heater for heating a metal mold; a metal mold cooler provided in a position substantially adjacent to the metal mold heater; a shifting table to which a plurality of the metal molds are detachably mounted on the upper surface thereof and shifting laterally over the metal mold; a resin apply device provided substantially in the side portion of the metal mold heater for applying the resin onto the mold; a degasificater elevating above the metal mold cooler for filling the applied resin in the mold; a fabric mat supply device moving in and out above the metal mold heater for pressurizing the fabric mat to bond with the resin in the metal mold and carried by the shifting table by exerting tension stress to the entire surface of the fabric mat; and a removing device moving in and out over the metal mold cooler for removing the finished fabric mat and carried by the turn table from the metal mold.

The third embodiment of the present invention is an apparatus for backing up the vehicle mat comprising: a resin apply device provided in the outer side portion of the apparatus for applying the resin in the metal mold; a metal mold cooler including a degasificater provided in the upper portion of the metal mold cooler and the degasificater filling the applied resin to the metal mold; metal mold heaters respectively provided on both sides of the metal mold cooler; a laterally moving shifting table to which the mold is mounted and formed to a size which covers over the upper surface of both the metal mold heater either metal mold cooler, and the shifting table laterally moving over the metal mold heater and the metal mold coolers for carrying detachably mounted metal molds on the shifting table; and fabric mat supply device laterally moving in and out over the metal mold heater for pressure bonding the fabric mat to bond with the applied resin on the metal mold heater carried by the shifting table.

OBJECTS OF THE INVENTION

An object of the present invention is to provide a method for backing up the vehicle mat that prevents crack formation on the synthetic resin which is bonded with the rear surface of the vehicle mat that results from the air mingled in the synthetic resin which also prevents the fabric mat from peeling off from the backing up material such as synthetic resin.

Another object of the present invention is to provide a compact apparatus for backing up the vehicle mat capable of being installed even in narrow spaces which produce constantly uniform products by eliminating troubles with the placing and removal of the fabric mat.

BRIEF DESCRIPTION OF DRAWINGS

By way of example and to make the description more clear, reference is made to the accompanying drawings in which.

DETAILED DESCRIPTION OF THE PREFERRED EMBODIMENT

Figure 1:
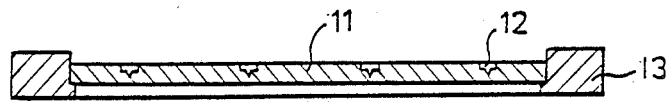
FIGS. 1 thru 7 are partially enlarged cross-sectional views respectively, each of which shows the method for backing up fabric mat according to the invention.

These and other objects will become more apparent when the invention is considered in connection with the drawing.

Hereinunder is a description of a method for backing up the vehicle mat as shown in FIGS. 1 thru 7.

First, a predetermined shaped metal mold, which is capable of being heated and cooled, is selectively mounted on a mounting frame (13) provided on a turn table (not shown). In this embodiment, the metal mold (11) defines a plurality of tapered small apertures (12) at the upper surface thereof for mold resin (14) with slipping proof protrusions at the rear surface thereof. Resin (14) in the sol condition is applied to the above-mentioned metal mold (11). Here, any resin (14) is applicable as long as it is capable of being changed into the gel condition when heated. However, it is preferable that the resin have high rigidity with high endurance against the heat, i.e., deformation proof characteristic of the resin material in the gel condition. In this embodiment, the resin is sol-condition plastic made by compounding vinyl chloride resin with plasticizer such as 2-octylehexylephtalete or n-octylephtalete with 30-35 percentages of the vinyl chloride. The resin (14) is applied to the metal mold (11) by exturding the resin from a nozzle (not shown) for applying to the mold (11) by exerting the pressure to the resin. The resin (14) may be applied to a metal mold by utilizing gravitation, where the metal mold is small in size and the applying time period is sufficient.

Figure 2:
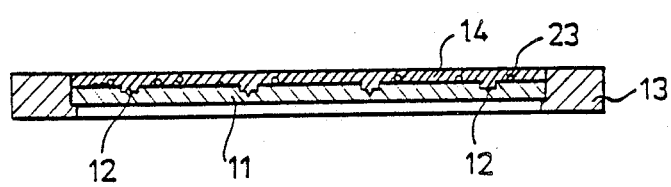
Figure 3:
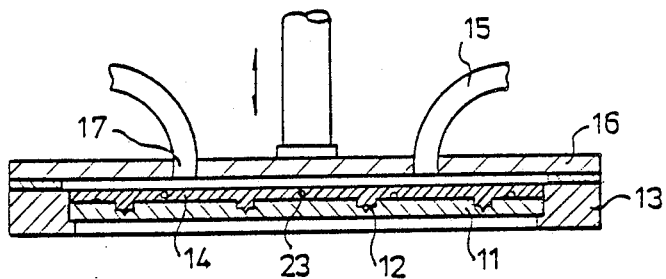
Figure 4:
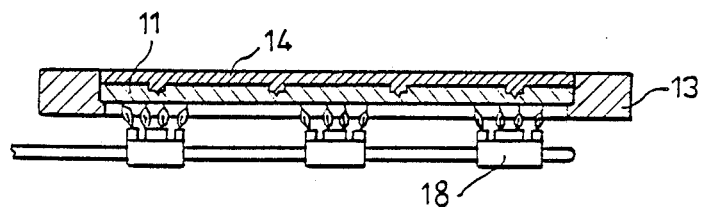
Figure 5:
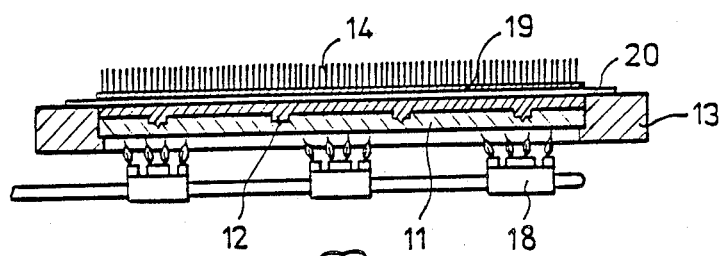
Figure 6:
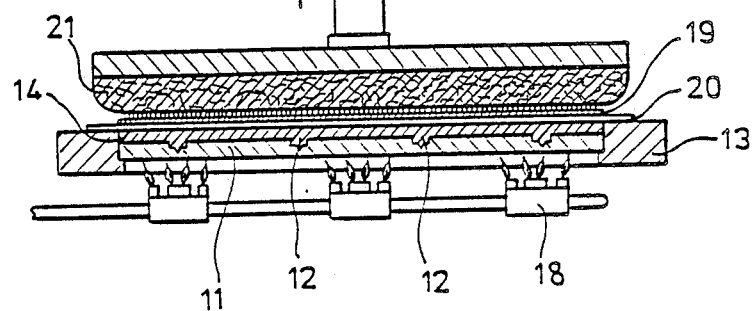
Figure 7:
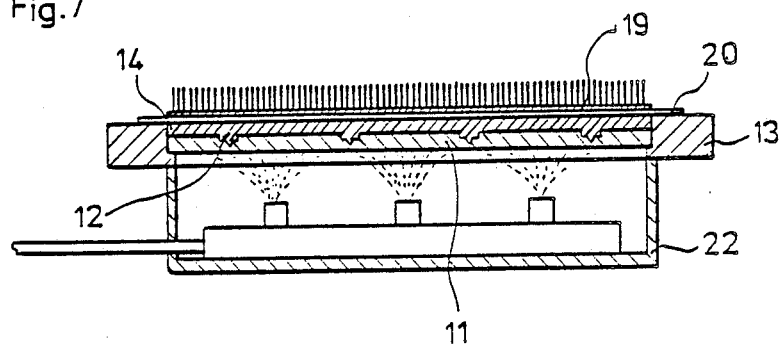

Secondly, after air froth (23) in the resin (14) is degasificated, the resin is filled into the metal mold (11). The resin primary applied contains a great amount of air froth (23) as shown in FIGS. 2 and 3. Air froth (23) contained in the resin (14) is removed for filling the resin even in the portions occupied by the air in the metal mold (11) without fail. The removing process of air froth (23) is described hereinunder. Firstly, a plurality of air inhaling holes (17) are perforated on a mounting frame (13) to which the metal mold is mounted. Secondly, a suction hose (15) connected with a vaccum pump (not shown) is attached to a vacuum pad (16). Thirdly, the vacuum pump (not shown) starts to be operated for degasificating air froth (23) in the resin (14) and the air interposed between vacuum pad (16) and the resin (14) through air inhaling holes (17).

The resin (14) thus filled in the metal mold (11) is changed into the semi-gel condition responsive to heat application. However, the resin (14) is not completely changed into the gel condition in spite of heat application, but into the semi-gel condition while remaining the property of liquidity. The resin (14) is changed into the semi-gel condition by directly applying heat to the bottom surface of the mold (14) by means of a metal mold heater (18) provided beneath a turn table (not shown). Heating temperature is determined by taking the type of resin (14) and material of the fabric mat (19) into consideration. According to this embodiment, the metal mold (11) is heated so that the surface temperature of the resin (14) in the metal mold (11) become 180° C. Heating of the mold is not limited to be performed when the filling of the resin (14) is finished, but it may also be performed when the metal mold (11) is mounted to the table (not shown) or when the resin (14) is applied to the mold (11).

The resin (14) thus heated and changed into semi-gel condition is pressure bonded with the fabric mat (19) by exerting tension stress to the entire surface of the fabric mat (19).

The fabric mat (19) includes a pile layer and a base cloth. The fabric mat may be a mat made by tufting the base cloth (20) of non-woven fabric (20) which is applied to a pile layer made of synthetic fiber or a mat made by napping resin after a base cloth (20) is sealed to a resin. The fabric mat (19) made such as above is placed onto the resin (14) in the semi-gel condition. Here, the fabric mat (19) is placed onto the resin (14) to exert tension stress to the entire surface by pulling four corners of the mat substantially in the outward direction so as to disturb crease formation on the base cloth (20) of the fabric mat (19). The pressurizing device (21) provided over the fabric mat (14) fixes the fabric mat (19) to the resin (14) by pressure bonding the fabric mat (19) with the resin (14) to exert tension stress to the entire surface by means of the pressurizing device (21). Thus, the fabric mat (19) is sealed to the resin so as to form an integral single body structure by eliminating gaps between the fabric mat (19) and the resin (4). The fabric mat (19) may also be sealed to the resin (14) by adopting another process i.e., one end of the base cloth (20) of the fabric mat (19) is fixed onto the mounting frame (13) of the metal mold (11), and a roller pressing another end moves while exerting the pressure to the fabric mat (19)

for pressure bonding the fabric mat (19) with the resin (14) so as to form an integral single body structure by eliminating gaps between the fabric mat (19) and the resin (14).

Subsequently, heat is applied again to the bottom of the metal mold (11). Heat is directly applied to the bottom surface of the metal molds by means of the metal mold heater (18) provided beneath the turn table (not shown), in the same manner as discribed in the above-mentioned heating process. In this process, the resin (14) changed into semi-gel condition is completely changed into gel condition.

The following is a description of the process for changing the semi-gel resin (14) into the rubber-like solid condition by directly cooling the bottom surface of the metal mold (11).

A metal mold cooler (22) provided below the turn table (not shown) injects coolant to the bottom surface of the metal mold (11) for directly cooling the metal mold (11). The resin (14) changed into gel condition in the metal mold is rapidly cooled down, and then changed into a rubber like condition. After the resin is changed into a completely rubber like condition, the vehicle mat is removed from the metal mold (11).

Removal of the vehicle mat from the metal mold (11) is performed by a removing device (not shown). Here, removal of the vehicle mat may be manually performed directly.

Accordingly, the vehicle mat is backed up under the process shown hereinabove.

The first embodiment of the apparatus for backing up the vehicle mat according to the present invention is described in detail hereinunder on the basis of the accompanied drawings.

Figure 8:
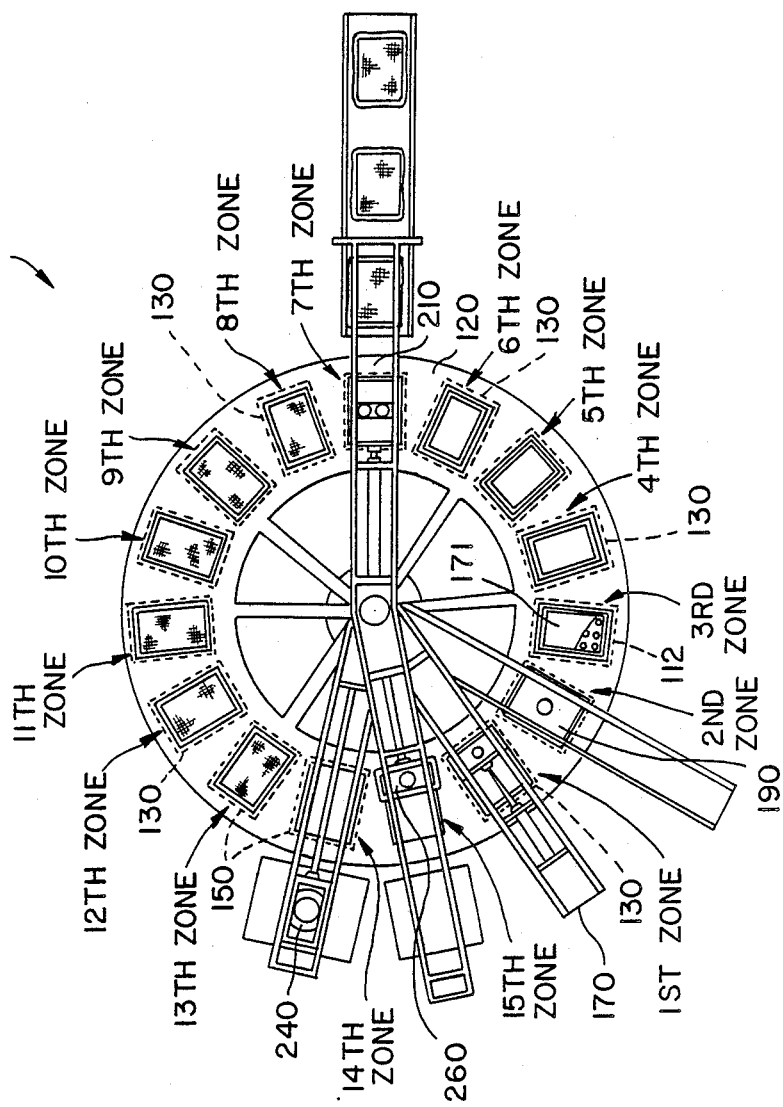
FIG. 8 is a plan view showing entire parts of an apparatus for backing up the vehicle mat according to the first embodiment of the invention.

FIG. 8 is a plan view showing the entire parts of the apparatus according to the first embodiment of this invention.

Figure 14:
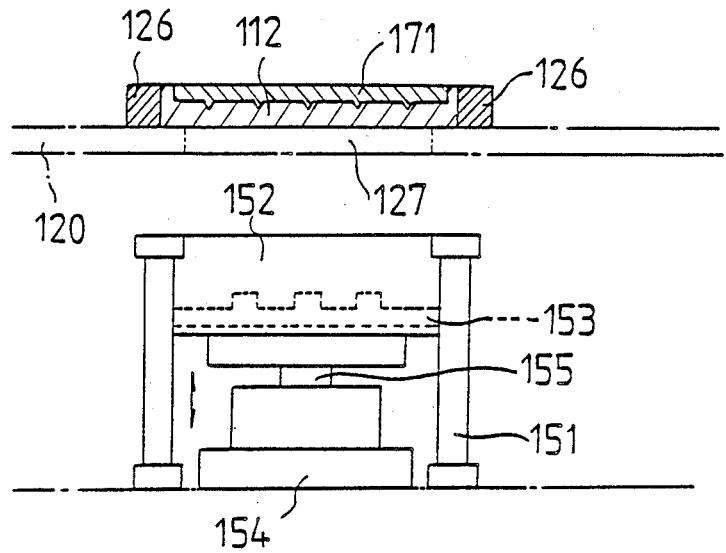
FIGS. 14 and 15 respectively show two different side elevations of the metal mold cooler.

Referring to FIGS. 8 and 14, in the center portion of the backing up apparatus (111) according to this invention a ring-shaped turn table is provided (120) on which metal molds (112) are capable of being mounted. Below the turn table (120) are provided the metal mold heater (130) for heating the metal mold and a metal mold cooler (150) for cooling the metal mold. Furthermore, on the peripheral outer portion of the turn table (120) are provided a resin applying device (170), a degasificater (190), a fabric mat supply device (210), a mold replacing device (240), and a removing device (260).

This apparatus (111) for backing up the vehicle mat according to the first embodiment may be divided into 15 zones as far as function is concerned. Specifically, a first zone is an area where the resin apply device (170) is provided on the outer peripheral portion of the turn table (120), a second zone subsequently aligned along the turning direction is an area where the metal mold heater (130) is provided beneath the turn table while the degasificater (190) is provided beneath the turn table (120). The third thru sixth zones consist of an area where the metal mold heater (130) is provided beneath the turn table (120). A seventh zone is an area where the metal mold heater (130) is provided beneath the turn table (120) while the fabric mat supply device (210) is provided at the outer peripherial outer portion of the turn table (120). The eighth thru twelfth zones consist an area where the metal mold heater (130) is provided beneath the turn table (120). A thirteenth zone is an area where the metal mold cooler (150) is provided beneath the turn table (120). A fourteenth zone is an area where the metal mold heater (150) is provided beneath the turn table (120), and a metal mold replacing device (240) is provided on the peripherial outer portion of the turn table (120). A fifteenth zone is an area where the removing device (260) is provided at the outer peripheral portion of the turn table (120).

As shown in FIGS. 8, 9, 14 and 17, the turn table (120) is a ring-shape turn table which spans across a pair of disk-shaped supporting bases (122) installed on the concrete base (122), and each upper end of the turn table (120) is connected with a wheel (121) so that each support base (122) rotatably supports the turn table (120). The turn table (120) having a structure such as above is intermittently moved by means of a DC servo motor (123) provided at the outer peripheral portion of the turn table (120), and the movement of the turn table (120) is transmitted to a pully (125) via a transmission (124). Thus, the pully (125) abuts with the side portion of the turn table (120) for rotating the turn table (120) in the direction opposite to the rotating direction of the pully (125). According to this embodiment, the turn table (120) stops for thirty minutes for every 24 degree rotating angle of the turn table (120) and then the rotating table stops 15 times per one full rotation. On the upper surface of the turn table (120), fifteen mounting frames (126) for mounting the metal mold (112) define at intervals. Inside each frame (126) is formed a small aperture (127) having a dimension slightly smaller than the size of the metal mold (112). The mold (112) which is detachably secured on the turn table (120) is a plate having a size 890 mm by 670 mm by 10 mm by outer dimension, and the plate is formed to a size which is proper to the vehicle mat. Each metal mold (112) is exchangeable depending on the size of the vehicle mat to be produced, and each mold may be also detachably mounted as occasion demands. Therefore, fifteen molds are capable of being mounted on the embodiment of this invention, and at most fifteen kinds of different vehicle mats are capable of being produced at one time. On the upper surface of the turn table (120) at each peripheral portion of each mounting frame (126), a mold fastener (128) is provided for fastening each mold (112) to the mounting frame (126) when mounted. Beneath the turn table (120), a metal mold heater (130) for heating the metal mold and a metal mold cooler (150) provided on a concrete base for cooling the metal mold (112) are provided independent from the turn table (120).

Referring to FIGS. 8 thru 12, a metal mold heater (130) is provided beneath the turn table (120) in each of 1 thru 12 zones of the apparatus for backing up vehicle mat (111). The metal mold heater (130) as above includes a frame (131) secured on the concrete base, and a gas burner (132) provided inside the frame (131). In this embodiment, each of the twelve metal mold heaters (130) are located at each predetermined position beneath the turn table (120), and each metal mold heater (130) is preset so that the resin is heated until the surface temperature becomes approximately 180° C. Further in this embodiment, a gas burner (132) may be an infrared radiation type or a gas pipe type. Between the adjacent two metal mold heaters (130), a duct (135) to which a burning blower and an exhaust fan are mounted is provided.

The metal mold (112) inside the frame (126) secured on the above-mentioned turn table (120) is directly heated from the bottom surface thereof.

Besides the metal mold heater (130), the metal mold coolers (150) are provided beneath the turn table (120).

Figure 13:
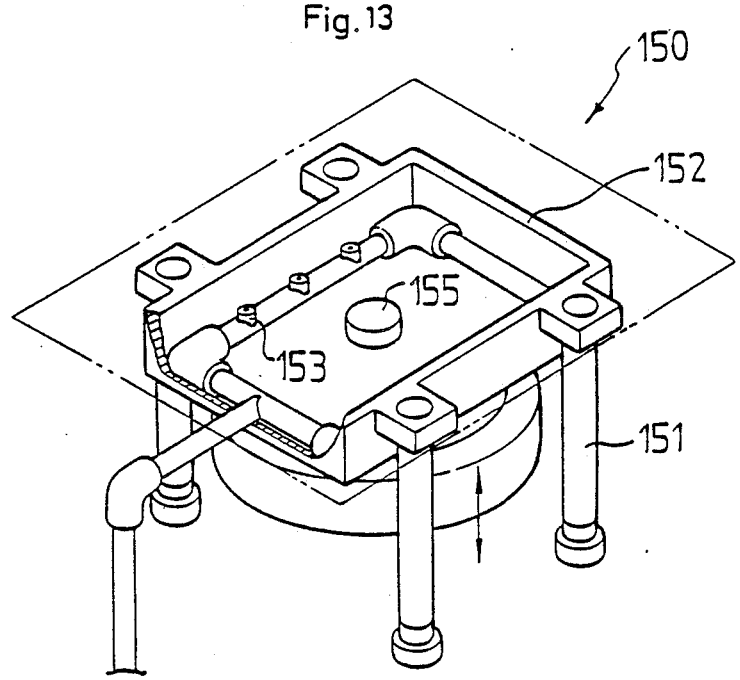
FIG. 13 is a perspective view of a metal mold cooler for cooling the metal mold of the apparatus for backing up the vehicle mat according to the first embodiment of this invention.
Figure 15:
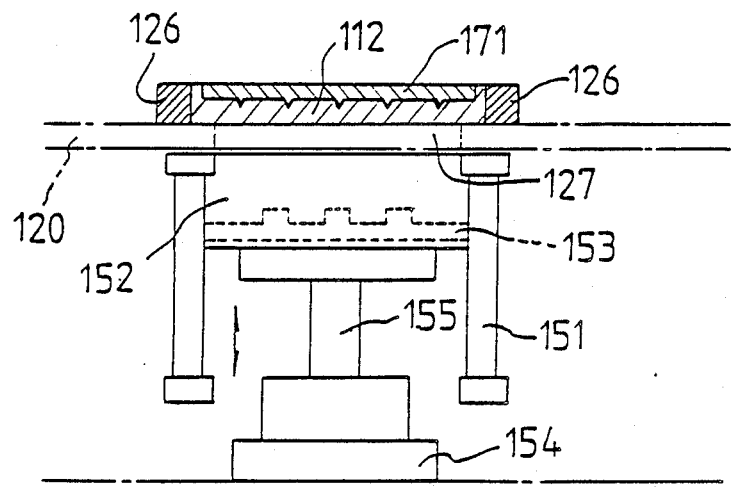

The metal mold coolers (150) are provided in the thirteenth and fourteenth zones respectively in the apparatus (111), and each metal mold cooler (150) includes a cylinder (154) secured on the concrete base, a water tank (152), and three shower nozzles (153) extending from the inner surface of the water tank (152), as shown in FIGS. 13 thru 15. The water tank (152) is a box-shape tank secured by four supporting pillars (151). To the bottom surface of the water tank (152), is fixed one end surface of a shaft (155) of a cylinder (154). The cylinder (154) is secured on the concrete base, and the water tank (152) elevates up and down responsive to the movement of the cylinder shaft (155). When the metal mold (112) is carried by the turn table (112) to the position right above the water tank (152), the cylinder shaft (154) is pulled and then the water tank (152) moves upward for cooling the bottom surface of the mold (112) by injecting coolant from the shower nozzles (153) which is provided inside the water tank (152).

The following is an explanation for a resin apply device provided in the first zone of the backing up apparatus for a vehicle mat according to the first embodiment of this invention mounted on the turn table (120).

Figure 16:
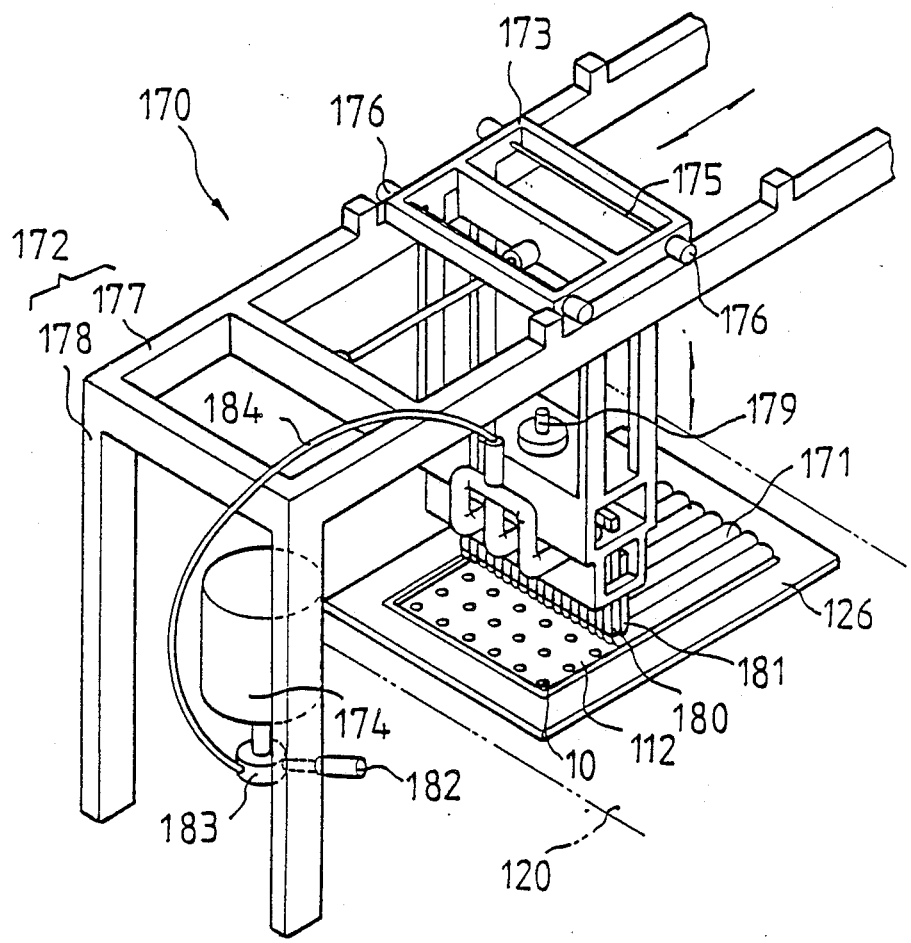
FIG. 16 is a perspective view of a resin applying device of the apparatus for backing up the vehicle mat according to the first embodiment of this invention.

Referring to FIG. 16, the resin apply device (170) is for applying the synthetic sol resin (171) to the metal mold (112).

The resin apply device (170) includes an outer frame (172), an inner frame (173), and a synthetic resin tank (174). Above the turn table (120) is provided a box-shape inner frame (173) that covers the upper surface of the turn table (120). A pair of shafts (175) extend from the upper end of the inner frame (173) respectively for rotatably fixing sliding rollers (176) to the shafts (175). The sliding rollers (176) as above are supported by the outer frame (172) including a rectangular upper frame (174) on which the rollers slide and a supporting pillar (178) secured to the rollers moves on the upper frame (177) laterally to the axial direction of the turn table (120) by a driving motor (not shown) secured to the outer frame (172).

The elevating cylinder (179) is secured to the inner frames (173) and a plurality of resin apply nozzles (180) are mounted on one end of the cylinder (179) shaft for applying the sol resin (171) injected from the resin applying nozzles (180) to the metal mold (112) provided onto the turn table (120).

The resin tank (174) is provided adjacent or aligned on the outer frame (174) on the outer peripheral portion of the turn table (120). The resin tank (174) as above accomodates plastic sol made by compounding vinyl chloride with 30-35 percentages of plasticizer such as 2-octyhexylephtalete or n-octylephtalete. Responsive to the movement of the turn table (120), the resin compounded as such is transported to a resin apply pump (not shown) interlocked to and operated by a resin apply open/close cylinder (182) via a resin tap (183) which is controlled to be opened responsive to the action of the above-mentioned resin apply open/close cylinder (182) mounted below the tank (174). Subsequently, the resin apply nozzles (180) apply resin (174) to the metal mold (112) mounted on the upper surface of the turn table (120).

Here, the amount of applied resin (171) is regulated by a resin tap (183) provided beneath the resin tank (174). The resin (172) is heated by the above-mentioned heater (not shown) provided beneath the turn table (120) in the first zone for changing the sol resin into semi-gel condition to be easily deposited with the fabric mat (114).

In the upper portion of the second zone adjacent to the resin apply device (170), a degasificater (190) is provided.

Figure 17:
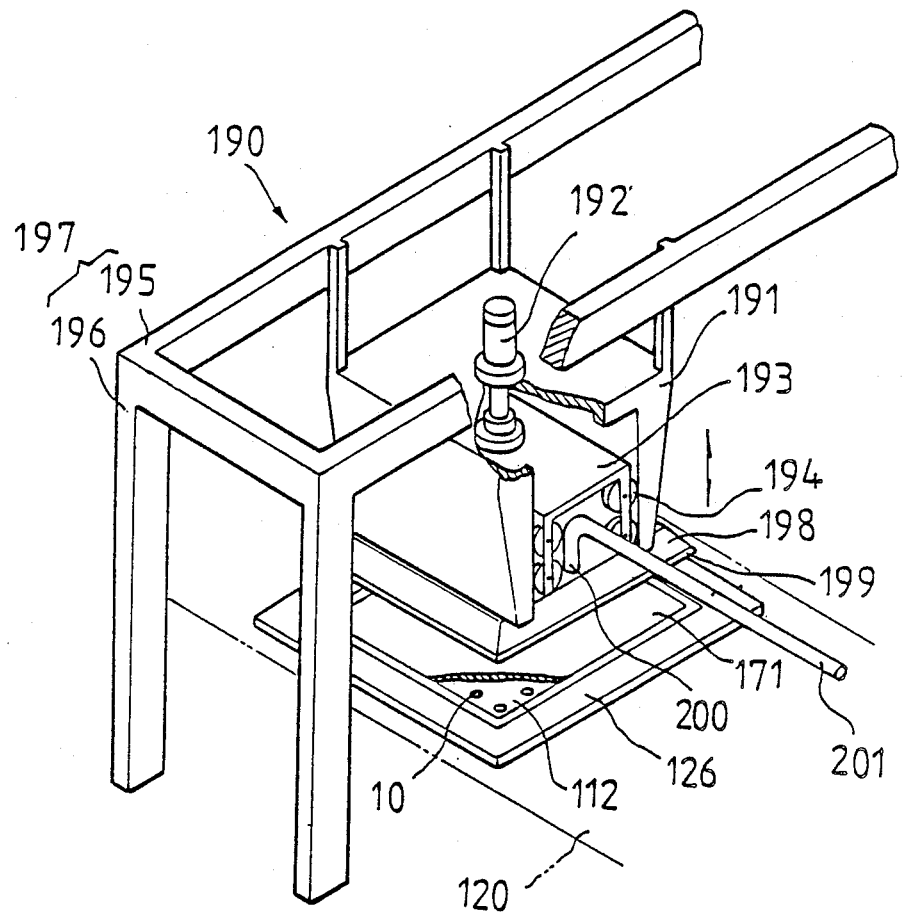
FIG. 17 is a perspective view of a degasificater of the apparatus according to the first embodiment of this invention.

The degasificater (190) fills the resin applied by the resin apply device in the metal mold. The metal mold defines a plurality of apertures (10) for forming slip-proof protrusions extending from the vehicle mat, and the resin is required to be filled completely in the apertures. As shown in FIG. 17, the degasificater (190) includes a box-shape frame (191) covering over the upper surface of the metal mold (112), and an elevation cylinder (192) connected to the upper end surface of the frame (191). The frame (191) includes an inner frame (193) provided inside thereof, and a shaft of the elevation cylinder (192) is connected with the upper end surface of the inner frame for elevating the inner frames (193) responsive to the expansion and the contraction of air in the cylinder (192). Furthermore, the inner frame (193) has mounted on rollers (194) at the side portion thereof, and the roller (194) starts to rotate abutting on the frame (194) responsive to the elevation of the inner frame (193). Accordingly, rattling of the inner frame (193) that occurred when the inner frame (193) elevated is eliminated, and smooth elevation of the inner frame is attained (193). The frame is attained (191) is supported by the outer frame (197) including a rectangular-shaped upper frame (195) and a supporting pillar (196) secured to the outer peripheral portion of the turn table (120) for supporting the rectangular-shape upper frame (195).

The inner frame (193) is provided with a vacuum pad (198). The vacuum pad (198) is trapezoidal shape, to which rubber packing (191) is sealed at the lower peripheral end thereof which abuts with the mounting frame (126). This vacuum pad (198) defines two air intake holes (200) perforated on the vacuum pad (198) on the upper surface thereof. One end of a hose (201) is fitted to each air intake hole (200) perforated on the vacuum pad (198), and another end of each hose (201) is connected with a vacuum pump (not shown).

Responsive to the rotation of the turn table (120), the metal mold (112) moves below the degasificator (190), and the elevation cylinder (192) of the frame (191) starts to move for transporting the vacuum pad (198) above the resin (171) and sealing the vacuum pad (198) to the peripheral edge of the mounting frame (126).

After air in the vacuum pad (198) is inhaled by the vacuum pump (not shown), air between the metal mold (112) and the resin (171), as well as air froth in the resin (171) is removed, whereby the resin (171) is capable of being filled even in the tapered small holes (10) perforated on the metal mold (112) without fail. According to this invention, even small sized protrusions are capable to be provided without fail on the rear surface of the vehicle, while preventing crack formation on the rear surface of the vehicle mat and peeling off of the fabric mat from the synthetic resin.

In this invention, to maintain the semi-gel condition of the resin in the metal mold, a metal mold heater is also provided in the position below the turn table where the degasificater (190) is provided.

Referring to FIGS. 8 and 10 thru 12, metal mold heaters (130) are provided adjacent to the degasificater (180) in the zones 3-6 respectively beneath the turn table (120) for keeping the resin (171) in the metal mold (112) in semi-gel condition. Particularly, the metal mold (130) provided in the sixth zone is capable of adjusting the temperature by heating the resin (171) when the surface temperature of the resin is below 180° C., while cooling the resin (171) when the surface temperature of which exceeds 180° C. responsive to a signal from the radiation thermometer (not shown) functioning as a device for detecting the surface temperature of the resin (171) in the metal mold mounted onto the turn table (120).

At the peripheral portion in the seventh zone a fabric mat supply device (210) is provided which moves above the metal mold containing resin and pressurizes the fabric mat to bond with the resin while exerting tension stress to the entire surface of the fabric mat.

Figure 18:
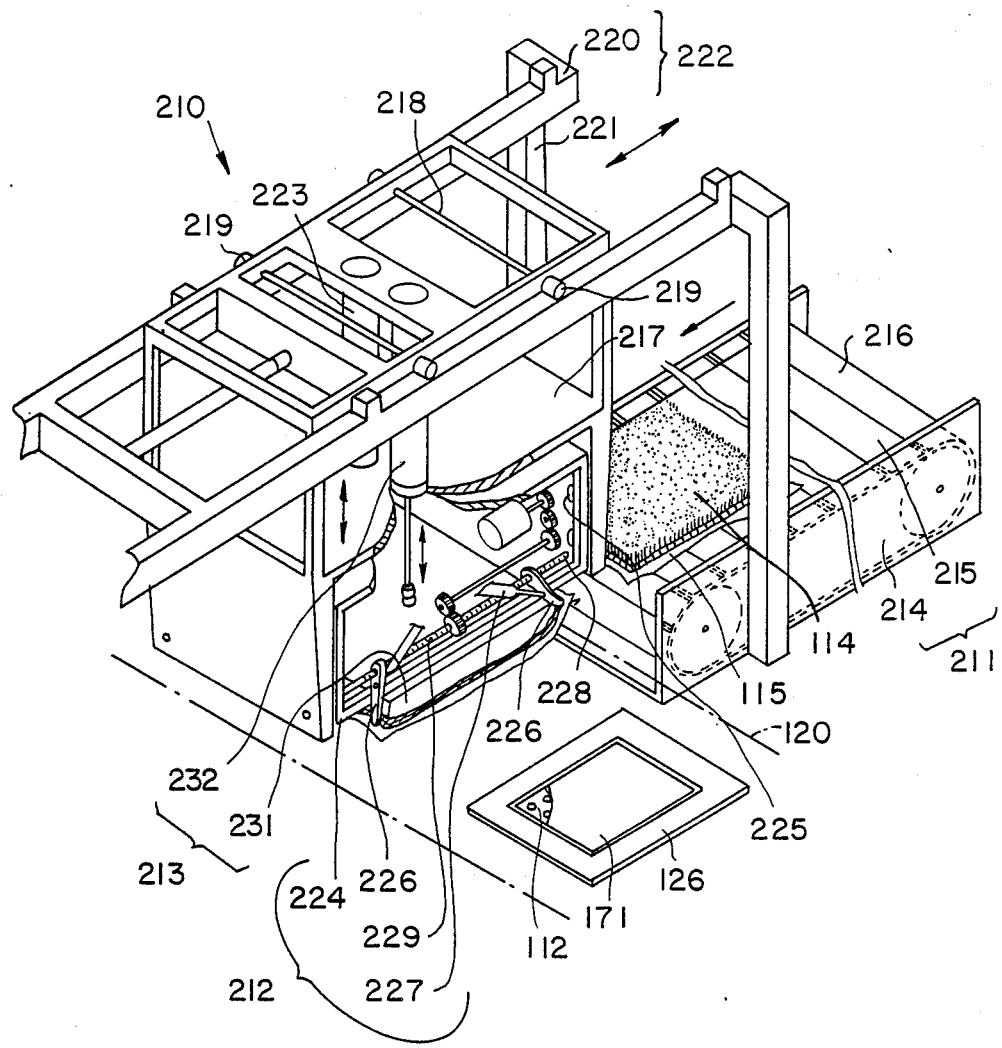
FIG. 18 is a perspective view of a fabric mat supply device of the apparatus according to the first embodiment of this invention.

As shown in FIGS. 8 and 18, the fabric mat supply device (210) includes a conveying device (211), a fabric mat supply device (212), and a pressurizing device (213).

The conveying device (211) includes a box-shape truck (214) extending to the outer direction from the turn table (120) and a conveyor (215) rotatably mounted to the direction of the turns table (120) by a drive motor (not shown) provided inside the truck (214). The upper surface of the conveyor (215) of this truck (214) accomodates three sheets of fabric mats (114) alinged in the longitudinal direction. Each fabric mat (114) as above is made by forming a pile layer on the base cloth (115), and the edge of the base cloth (115) is forced out from the peripheral end of the fabric mat (114). The drive motor (not shown) starts to rotate the conveyor (215) and the fabric mat (114) on the conveyor (215) is transported to the direction toward the turn table (not shown). The fabric mat (114) thus transported by the conveyor (215) is placed on the resin (171) whose upper surface is in the semi-gel condition on the turn table (120).

The supply device (212) is provided above the conveyor (211), and this supply device (212) has a structure similar to the above-mentioned resin apply device in which a box-shape frame (217) covers over the upper surface of the metal mold (112), a pair of shafts (218) are provided respectively on both the upper ends of the frame (217) for rotatably fixing the sliding roller (219) to the shafts (218). The sliding rollers (219) as above are supported by the outer frame (222) which is composed of a rectangular upper frame (2200 and a pillar (221) which supports the upper frame (220) and which is fixed to the outer periphery of the turn table (120). The rollers (219) move on the outer frame (222) to the axial direction of the turn table (120) for laterally moving the frame (217). On this frame (217) is provided an elevation cylinder (223), and the shaft of this elevation cylinder (223) is mounted on the box-shape inner frame (224).

A roller (225) is mounted to each side surface of the inner frames (224) so that the roller (225) abuts on the side surface of the frame (217). The inner frame (224) does not rattle during the elevation movement of the inner frame (224), since the roller (225) abuts on the side surface of the frame (217). Four hook-shape pin projections (226) are provided for four edges of the lower portion of the inner frame (224) respectively so that each pin projection extends towards the outer direction. The shaft of the cylinder (227) is connected to the base portion of the pin projections (226) for rotating the pin projections, and the pin projections (226) rotate to the outer direction responsive to cylinder (227) movement. Each pin projection (226) rotates to impale the four edges of the base cloth (115) forced out at the edge of the fabric mat (114) placed on the conveyor (211). Four bearings (228) are fixed to the lower portion of the inner frame (224) in the longitudinal direction, and two screw rods (229) respectively defining screw patterns which are directed opposite direction to each other from the central portion of the bearings (228). The screw rods (229) are rotated by two drive motors (230) installed beneath the inner frame (224). The base portions of the above-mentioned pin projections (226) are screwed into the both ends of the screw rods (229) so that the two pin projections (226) laterally move along the screw rods (229) respectively slightly apart from the screw rods (229) responsive to the rotation of the screw rod (229) for arranging the position of each pin projection with each corner in accordance with the size of the fabric mat (114). Accordingly, the pin projections (226) which fit to the four edges of the protruded parts from base cloth (115) of the fabric mat (114) placed on the conveyor (211) respectively rotate to impale the protruded parts, and the fabric mat (114) is lifted by the elevation cylinder (223) and the cylinder (not shown) of the outer frame (222) for transporting and setting the fabric mat (14) onto the resin (171).

A pressurizing device (213) is interposed in the center portion of the inner frame (224). The pressurizing device (213) includes a plate-like head (231) for pressurizing the upper surface of the fabric mat (114) placed on the resin (171), and a pressurizing cylinder (232) mounted in the direction perpendicular to the upper surface of the head (231) for pressurizing the fabric mat (114) by means of the head (231). To pressure bond the fabric mat (114) with the base cloth (115) with no gap therebetween, four corners of the protruded base cloth forced out from the periphery of the fabric mat (115) are pulled, whereby the fabric mat (115) and the semi-gel resin (171) are pressurized to bond the fabric mat (115) with the semi-gel resin (171) while keeping the fabric mat pulled (114).

Figure 9:
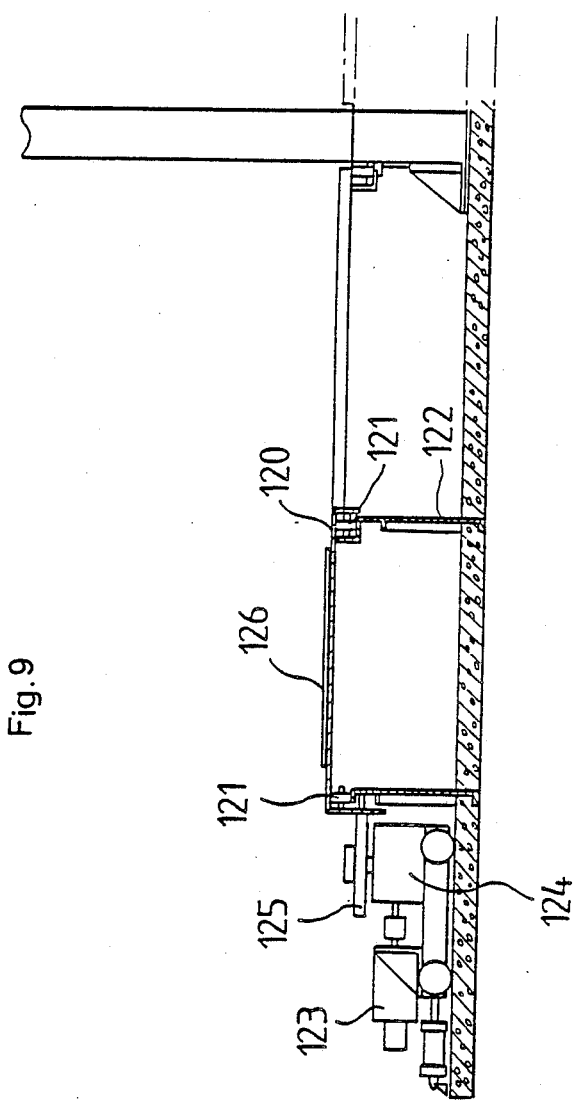
FIG. 9 is a side elevation of the apparatus for backing up a vehicle mat including a driving device and a turn table according to the first embodiment of this invention.
Figure 10:
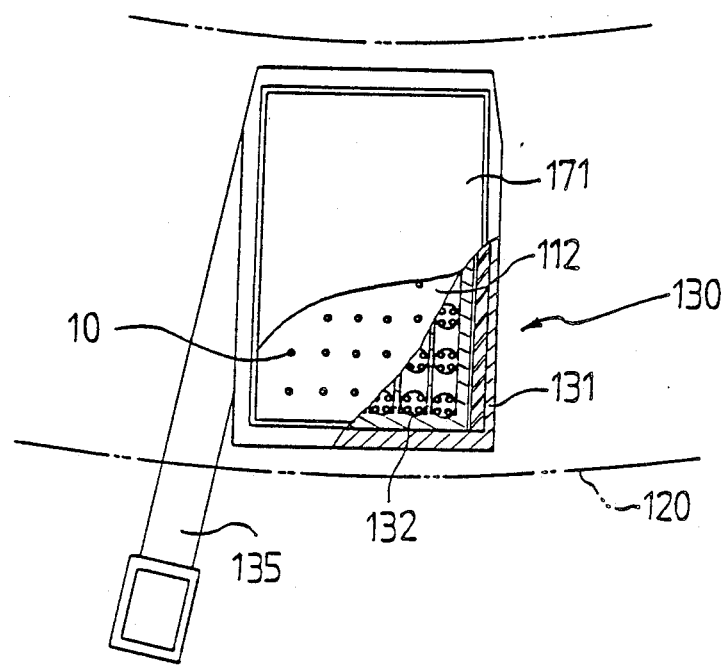
FIG. 10 is a plan view of a metal mold heater for heating a metal mold of the apparatus for backing up the vehicle mat according to the first embodiment of this invention.
Figure 11:
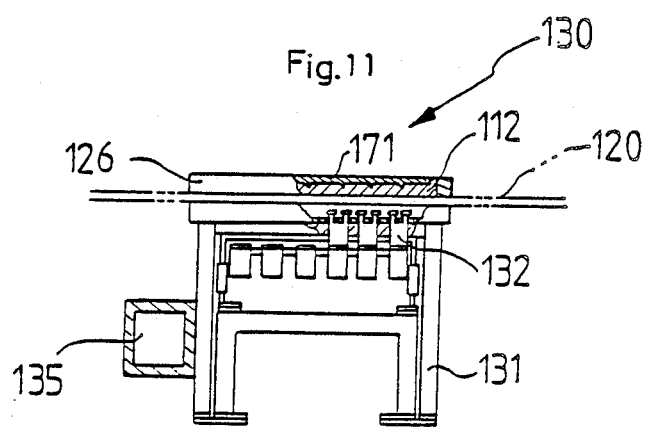
FIG. 11 is a front elevation of the metal mold heater.
Figure 12:
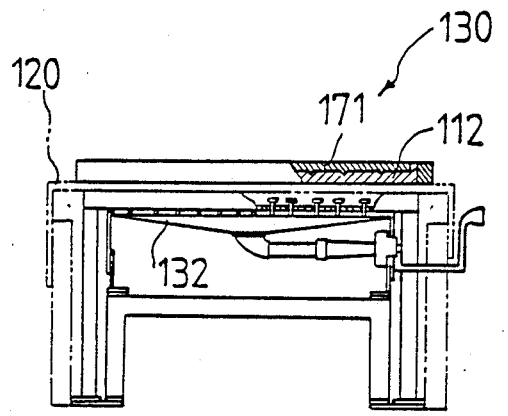
FIG. 12 is a side elevation of the metal mold heater according to the first embodiment of this invention.

As shown in FIGS. 8, 9, and 12, the pressurizing device is suceeded by five metal mold heaters provided beneath the turn table in the 8 thru 12 zones respectively. In the thirteenth and the fourteenth zones are respectively provided the metal mold coolers for cooling and changing the resin from semi-gel condition to the rubber like gel-condition.

In the fourteenth zone is provided a metal mold replacing device, as well as the metal mold coolers provided at the peripheral portion of the turn table.

Figure 19:
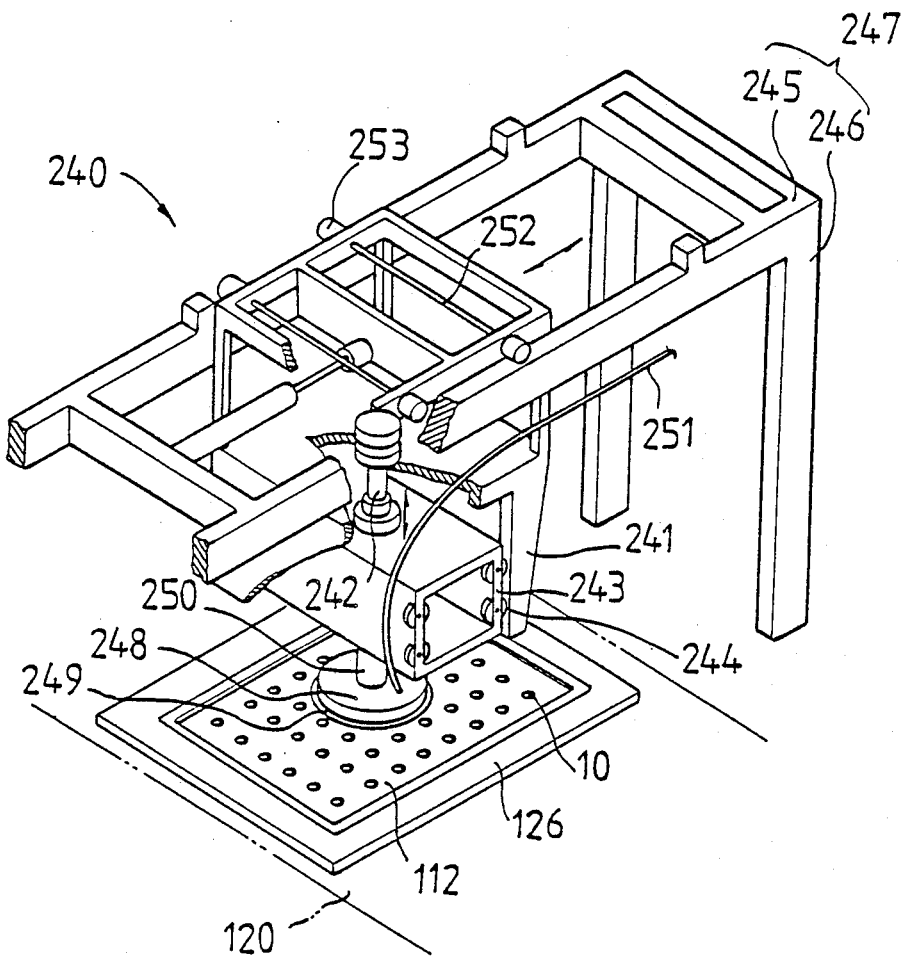
FIG. 19 is a perspective view of a metal mold replacing device of the apparatus according to the first embodiment of this invention.

As shown in FIGS. 8 and 19, the metal mold replacing device (240) is for replacing the metal mold depending on the size and the shape of the vehicle mat desired to be produced.

The metal mold replacing device (240) as above is provided in the manner that the box-shape frame (241) of the metal mold replacing device (240) covers over the upper surface of the turn table (120). The elevation cylinder (242) is mounted onto the upper surface of the frame (241). Inside the frame (241), the inner frame (243) is interposed, and the shaft of the elevation cylinder (242) is mounted onto the upper portion of the inner frame (243) for elevating the inner frame (243) responsive to the shaft movement of the cylinder (242). A roller (244) is rotatably attached to each side surface of the inner frames (243), and the rollers (244)) rotate abutting on the above-mentioned frame (241) responsive to the movement of the inner frame (242) in the upward direction. Accordingly, rattling occuring when the inner frame (243) elevates is eliminated, and smooth elevation of the inner frame (243) is attained. A pair of shafts (252) extend from the upper end of the frame (241) so that sliding rollers (253) are rotatably fixed to the shaft (252). The sliding rollers (253) are supported by the outer frame (247) composed of a rectangular upper frame (245) on which rollers slide and a supporting pillar (246) secured on the outer peripheral portion of the turn table (120), and the sliding rollers move on the upper surface of the frame (245) laterally to the axial direction of the turn table (120) by driving cylinder (not shown) secured on the outer frame (247).

An elevation cylinder (242) is mounted on the inner frame (243), while a vacuum pad (248) is mounted to the top end of the cylinder shaft of the elevation cylinder (242).

The vacuum pad (248) is a bowl-shape to which rubber packing (248) is sealed at the lower peripheral end of the vacuum pad (248) which abuts on the metal mold (112). The vacuum pad (248) defines an air inhaling hole (250) on the upper surface thereof. One end of a hose (251) is connected with the air intake hole (250), and another end thereof is connected with the vacuum pump (not shown).

On replacing the metal mold (112), the elevation cylinder (242) inside the inner frame (243) and a drive motor (not shown) inside the outer frame (247) is started to drive in accordance with the rotating speed of the turn table (120) for transporting and sealing the above-mentioned vacuum pad (248) with the metal mold (112).

Finally, the above-mentioned vacuum pump (not shown) is started to attract the metal mold (112) for removing the metal mold (112). Instead another metal mold (112) is mounted to the vacuum pad (248) for mounting the metal mold (112) to the mounting frame (126) of the turn table (120).

Figure 20:
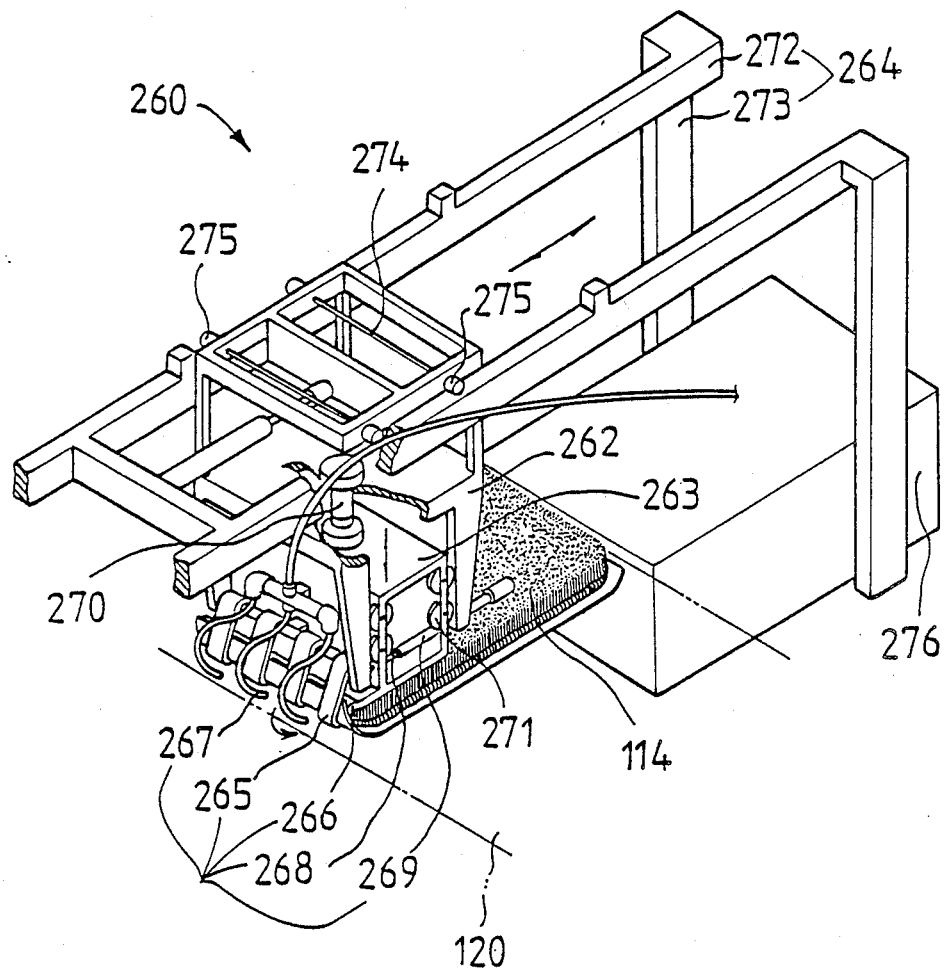
FIG. 20 is a perspective view of a fabric mat removing device of the apparatus according to the first embodiment of this invention.

As shown in FIGS. 8 and 20, in the fifteenth zone is provided a removing device (260) on the outer peripheral portion of the turn table (120) for removing the back up fabric mat (114) from the metal mold (120).

The removing device (260) includes a clamping device (261), and the inner frame (263) and the outer frame (264). The box-shape frame (262) is positioned above the turn table (120) so that the frame (262) covers over the upper surface of the metal mold (112), and the elevation cylinder (270) is mounted on the upper surface of this frame (262). Inside the frame (262) is interposed the inner frame (263), and the shaft of the cylinder (270) is connected to the elevation cylinder (270) so that the inner frame (263) elevates in accordance with the movement of the cylinder shaft (210). A roller (271) is rotatably attached to the side surface of each frame (224), while abutting on the frame (262) so that the roller (271) rotates abutting on the frame (262). Then, the roller (271) as above rotates abutting on the frame (262) responsive to the elevating movement of the inner frame (263). Accordingly, rattling of the inner frame (263) occuring when the inner frame (263) elevates is prevented, and thus smooth elevation of the inner frame (263) is realized. A pair of shafts (274) respectively extend from both upper ends of the frame (262) for rotatably fixing the sliding roller (275) to the shafts (274). The sliding rollers (275) as above are supported by the outer frame (264) including a rectangular upper frame (272) on which rollers slide and a supporting pillar (273) secured on the outer peripheral portion of the turn table (120), and the driving cylinder (not shown) secured to the outer frame (263) starts to rotate the sliding rollers (275) on the upper frame (273) so that the sliding rollers (275) move to the direction of the turn table (120), whereby the inner frame (263) is laterally moved.

An elevation cylinder (270) is secured onto the inner frame (263), while a clamp (261) is secured to a top end of the shaft of the elevation cylinder (270).

The clamp (261) includes: clamping pawls (265) aligned facing the turn table (120) below the inner frame (263); a supporting rod (266) holding and supporting the end edge of the fabric mat (114) when the clamping pawls (265) move rotatingly; air nozzles (267) provided outside of the clamping pawls (265), i.e., provided on the side of the turn table (120); and a cylinder (269) whose nose end of the shaft (268) is fitted to a base portion of the above-mentioned clamping pawls (265) which are provided opposite to the lower portion of the inner frame (263).

After the inner frame (263) is vertically moved to the position right above the fabric mat (114) placed on the turn table (120) responsive to the rotation of the turn table (120), and the air nozzles (267) of the clamping device (261) provided beneath the inner frame (263) inject air so as to peel off the end edges of the base cloth (115) which is forced out from the fabric mat (114). The above-mentioned clamping pawls (265) are moved rotatingly in the directions shown by arrows in the figure by means of cylinder (269), and the inner frame (263) is shifted laterally or vertically clamping one end of the fabric mat (114) between the clamping pawl (265) and the supporting rod (266) so as to move the fabric mat (114) onto the table lifter (276), the highest limit of which is regulated by a sensor.

In a backing up apparatus (111) for a vehicle mat according to a second embodiment of this application, various modifications thereof or parts thereof are allowable, for example, two metal molds may be mounted onto the upper surface of the turn table in the cross table direction, or two same devices may be provided at the periphery of the turn table (120) on the inner and outer sides respectively. The modification as mentioned above realizes enhanced working efficiency.

A second embodiment of the apparatus for backing up vehicle mat is explained in detail hereinunder on the basis of drawings.

Figure 21:
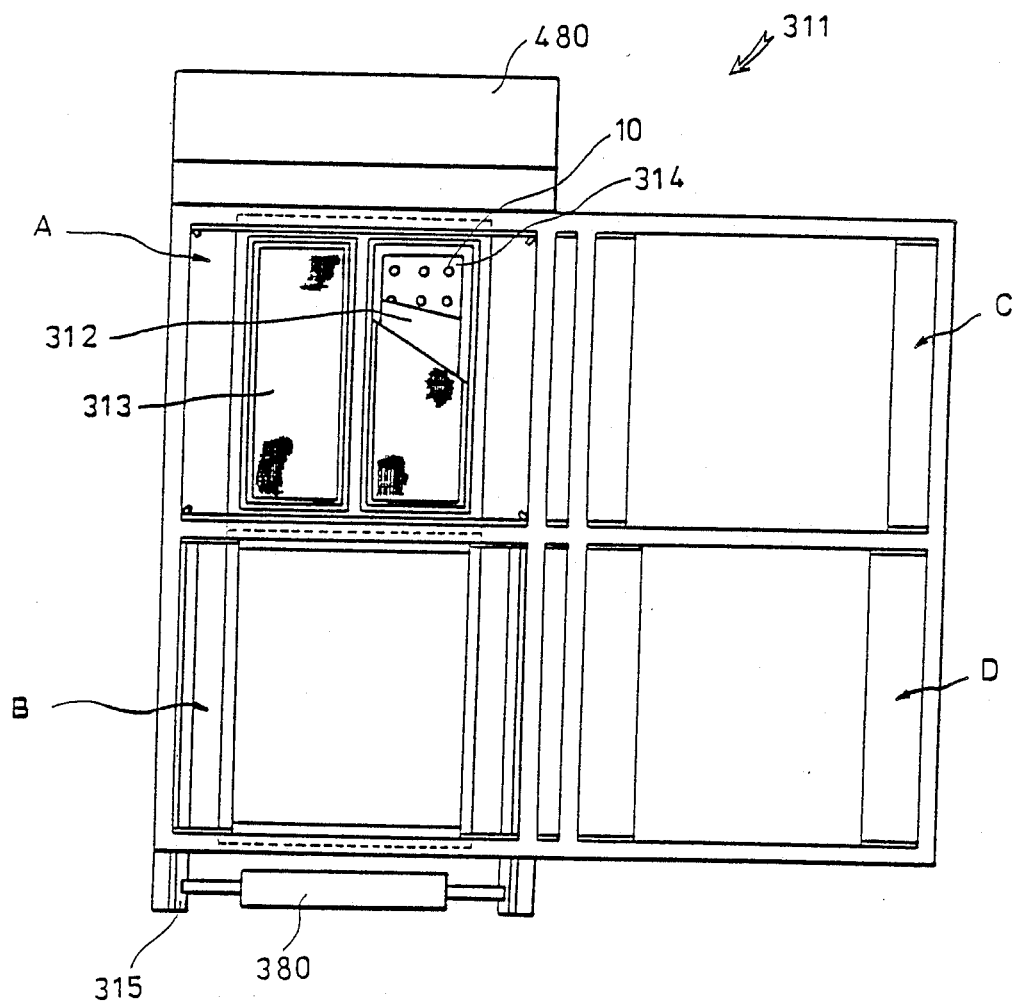
FIG. 21 is a plan view of the apparatus for backing up the vehicle mat showing the entire parts of the apparatus according to the second embodiment of this invention.
Figure 22:
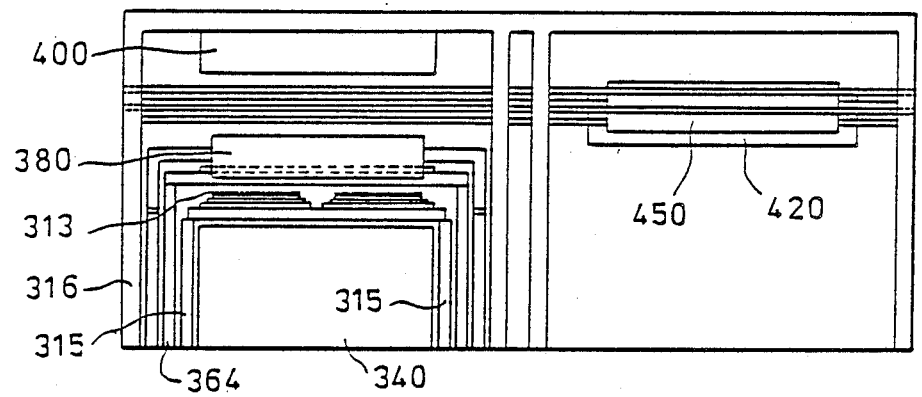
FIG. 22 is a front elevation of the apparatus according to the first embodiment of this invention.
Figure 23:
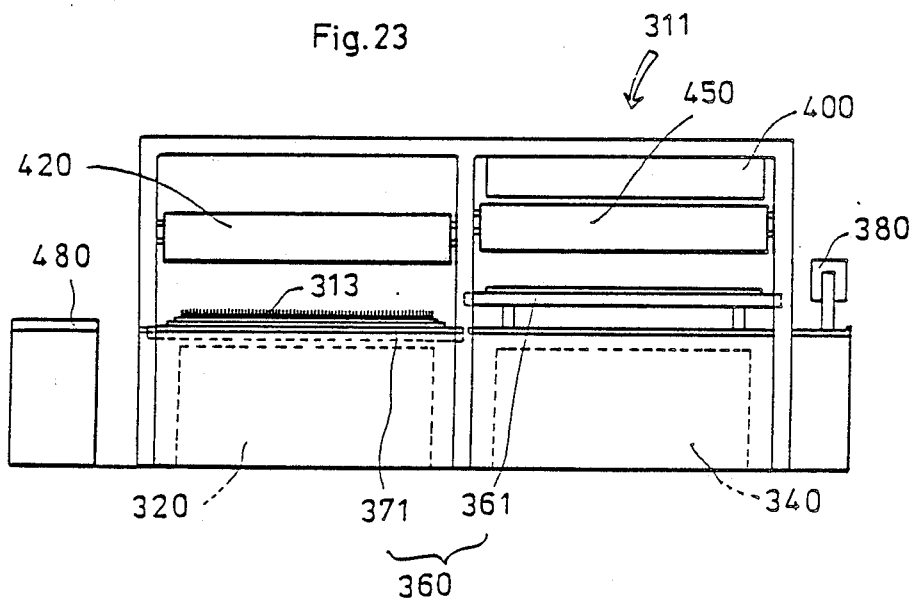
FIG. 23 is a side elevation of the apparatus according to the first embodiment of this invention.
Figure 24:
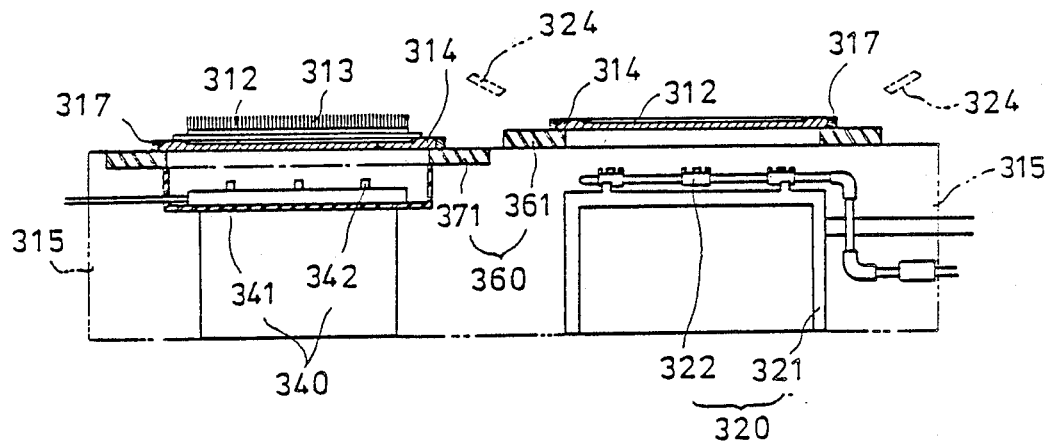
FIG. 24 is a cross-sectional view of the apparatus including a metal mold heater for heating the metal mold and a metal mold cooler for cooling the metal mold according to the second embodiment of this invention.

FIG. 21 is a plan view of an example according to the second embodiment of this application. FIG. 22 is a front elevation of this example. FIG. 23 is a side elevation of this example. Referring to FIGS. 21 thru 23, the backing up apparatus (311) according to this invention includes a metal mold heater (320) and a metal mold cooler (340) positioned adjacent the metal mold heater (320), peripheral devices provided on the upper and side portion of the metal mold cooler (340) in the manner that the peripheral devices surround the metal mold cooler (340) as the center of the apparatus (311).

The apparatus (311) as above is a box-shape, and divided into four groups in view of its function. Specifically, A zone where the metal mold heater (320) is provided, B zone where the metal mold cooler (340) is provided adjacent the metal mold heater (320). In A and B zones are provided shifting tables (360) shifting laterally onto the metal mold heater (320) and the metal mold cooler (340). A resin apply device (380) is provided on the side portion of the metal mold cooler (340) provided in B zone, while a degasificater (400) is provided above the metal mold cooler (340) in B zone which is capable of elevating upward and downward. Furthermore, a removing device (350) for removing the finished resin mat (313) and moving in and out onto the metal mold cooler (340) in the B zone is provided adjacent D zone.

Furthermore, a fabric mat supply device (320) moving in and out above the metal mold heater (320) in A zone for supplying the fabric mat (313) onto the resin (312) is provided in C zone which is adjacent to the metal mold heater (320).

Referring to FIGS. 21 thru 24, the metal mold heater (320) in A zone includes a frame (321) fixed onto a concrete base, and a gas burner (322) mounted onto the frame (321). In this embodiment, a metal mold heater (320) is preset to obtain the surface temperature of resin at 180° C. onto the metal mold (314) mounted onto the shifting table (360). Furthermore, in this embodiment, a gas burner (322) is a gas-pipe burner type. In the outer portion of the metal mold heater (320) of this embodiment, a duct (not shown) on which a burning blower and an exhaust fan are mounted is provided. The metal mold heater (320) applies heat to the metal mold (314) directly to the bottom of the shifting table (360) when the shifting table (360) shifts to the position right above the metal mold heater (320). Accordingly, the sol resin (312) in the metal mold (314) is changed into gel form. In the location above the metal mold (320) is provided a radiation thermometer (324) for detecting the surface temperature of the resin (312) in the metal mold (314). When the surface temperature of the resin (312) is detected below 180° C. responsive to the signal from radiation thermometer (324), heat is applied to the resin (312). When the surface temperature of the resin (312) is detected exceeding 180° C., the resin (312) is cooled down. In the manner as above, the surface temperature of the resin is adjusted.

The preset value of radiaction thermometer (324) is 180° C. in this embodiment, however, the preset value of the radiation thermometer (324) is determined taking the kinds of resin (312) and material of the fabric mat into consideration.

As shown in FIGS. 21 thru 24, in B zone adjacent the metal mold heater (320) is provided a metal mold cooler (340). The metal mold cooler (340) includes a water tank (341) secured onto the concrete base, and shower nozzles (342) protruded from inside the water tank (341). The water tank (431) is formed as box-shape. When the shifting table (360) moves and the fabric mat (313), to which resin (312) is applied, is moved right above the metal mold cooler (340), coolant is injected from a shower nozzle (342) inside the water tank (341) of the metal mold cooler (340) to the bottom surface of the metal mold (314) mounted on the shifting table (360) so as to cool down the metal mold (314).

Referring to FIGS. 21 and 23 thru 25, a shifting table (360) is provided so that the shifting tables (360) move above the metal mold heater (320) and metal mold cooler (340) located in A and B zones respectively. This backing up apparatus may includes an upper shifting table (361) and a lower shifting table (371), instead of one shifting table (360).

The upper shifting table (361) spans across the metal mold heater (320) and the metal mold cooler (340). An elevater (362) installing a driving motor (not shown) is mounted to each of four edges of the upper shifting table (361). Each elevater (362) is mounted onto the shifting table (361) by means of screw rods (364) respectively extending to the vertical direction and parallel to each other. Responsive to the rotation of the driving motor (not shown), the elevater (362) elevates upward and downward along with the screw rods (364) for moving the shifting table (361) upward and downward.

Figure 25:
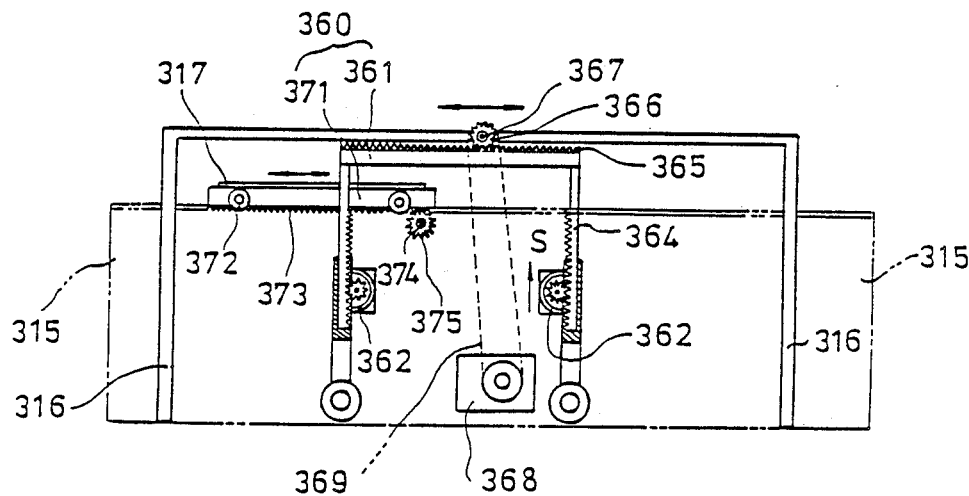
FIG. 25 is a side elevation of a shifting table of the apparatus according to the second embodiment of this invention.
Figure 26:
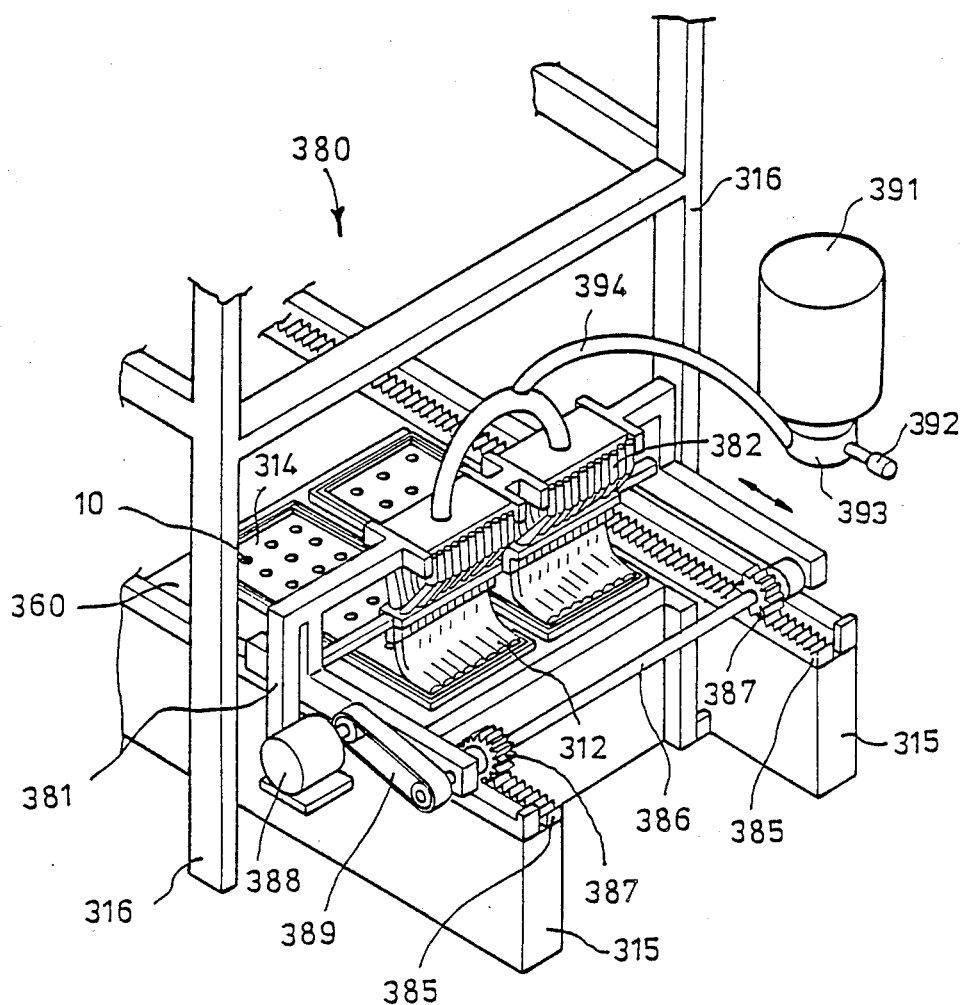
FIG. 26 is a perspective view of a resin apply device of the apparatus according to the second embodiment of this invention.

A rack (365) is mounted onto each end edge on the upper surface of the upper shifting table (361). A rotating shaft (367), both ends of which are fitted to the pinions (366), is provided transversely on the supporting frame (316) upstanding on the both side walls (315) of each of the device, namely, a metal mold cooler (320) provided in A zone and a metal mold heater (340) provided in B zone. Responsive to elevation of the upper shifting table (361) in the direction indicated by an arrow S as shown in FIG. 25, rack (365) is engaged to fit the pinions (366) both of which are fitted to both ends of the rotating shafts (367). As a result, driving force from the driving motor (368) provided substantially outside and beneath the metal mold heater (320) is transmitted to the rotating shaft (367) by means of chains (369), and then the pinions (366) start to rotate for laterally moving the upper shifting table (361) to which the rack (365) engaged with the pinions (366) is mounted. Two mounting frames (317) for mounting the metal mold (314) are mounted onto the upper surface of the upper shifting table (361). Inside these two mounting frames (317), a hole is perforated so that the hole has a diameter slightly smaller than that of the metal mold (314). A metal mold (314) detachably mounted onto the upper surface of the upper shifting table (361) is a plate having a size of 120 mm by 80 mm by 10 mm by outer dimension, and the size of this metal mold is changeable depending on the size of the vehicle mat needed to be produced. This metal mold (314) includes various modifications in accordance with the size and the shape of the vehicle mat to be produced, and then each mold is detachably mounted inside the mounting frame (317) for replacement, as occasion demands. Therefore, the apparatus according to this embodiment accomodates four metal molds (314), since the lower shifting table has a similar structure as the upper shifting table. Therefore the second embodiment produces at most four vehicle mats for each production process.

The lower shifting table (371) is formed to a size slightly smaller than the upper shifting table (361). The lower shifting table (371) is provided beneath the upper shifting table (361) so that the lower shifting table (371) moves independently from the upper shifting table (361). Two wheels (372) are rotatably supported at their axes by both ends of the lower shifting table (371). The wheels (372) are placed on both upper end surface of the side wall (315) for laterally moving the wheels (372) onto the upper end surface of the side wall (315). On the other hand, rack (373) is mounted onto the lower surfaces of both end edges of the lower shifting table (371). The rack (373) is engaged to fit to the pinions (375), both of which are fitted to the both ends of the rotating, shafts (374) provided transversing the two side walls (315). As a result, driving force from the driving motor (not shown) is transmitted to the rotating shaft (367) by means of chains (not shown) for laterally moving the lower shifting table (371) in which racks are fitted respectively to the pinions below the lower shifting table (371).

Hereinunder is a description of the resin applying device of the backing up apparatus adopting a backing up method according to the second embodiment of the present invention.

As shown in FIGS. 21 thru 23 and 26, when the shifting table (380) to which the metal mold (314) is mounted moves right above the metal mold cooler (340)

in B zone, the resin apply device (380) moves in and out above the shifting table (360) in the direction to A zone for applying resin (312) to the metal mold (314).

The resin apply device (380) includes an inner frame (381) and a resin tank (391). To the inner frame (381) is attached a plurality of resin applying nozzles (382). Each of these resin apply nozzles (382) injects compressed sol-condition resin (312) to the metal mold (314) which is mounted on the shifting table (360). In the lower end edges of the inner frame (381), a rotating shaft (386) is provided laterally, and pinions (387) are fitted to both ends of the rotating shaft (386) respectively. A rack (385) mounted on both side walls (315) is screwed into the pinions (387), and the driving force of the driving motor (388) which is provided above the inner frame (381) is transmitted to the rotating shaft (386) through the driving chains (389). The pinions (387) start to rotate for laterally moving the inner frame (381) along with the racks (385). By laterally moving the inner frame (381), a plurality of resin applying nozzles (382) of the inner frame (381) are able to move above the metal mold cooler (340) for moving the nozzles (382) in and out above the shifting table (360), thus applying resin (312) to the metal mold (314).

The resin apply tank (391) includes a resin apply tap open/close cylinder (392) and a resin apply tap (393). The resin tank (391) accomodate plastic sol made by compounding vinyl chloride with 30-35 percentages of plasticizer such as 2-octylehexilephtalete and n-octylephtalete. Responsive to the movement of the shifting table (360), the resin (312) goes through the resin apply tap (393) which is regulated to open responsive to the movement of the resin apply open/close cylinder (392) mounted below the tank (391), and then the resin (312) is transported to a resin apply pipe (394) by a resin apply pump (not shown) which is interlocked to the resin apply open/close cylinder (392) for applying the resin (312) to the metal mold (314) through the resin applying nozzles (382).

The applied amount of resin (312) is regulated by a resin apply tap (393) provided beneath the resin tank (391). Above the metal mold cooler is provided a degasificater (400) as well as resin apply device.

The degasificater (400) is for filling the applied resin completely over the metal mold by the resin apply device (380). The metal mold defines a plurality of small tapered holes (10) perforated for forming a plurality of slip-proof protrusions extending from the vehicle mat, and therefore it is required to completely fill the resin even in each of small tapered holes (10).

Figure 27:
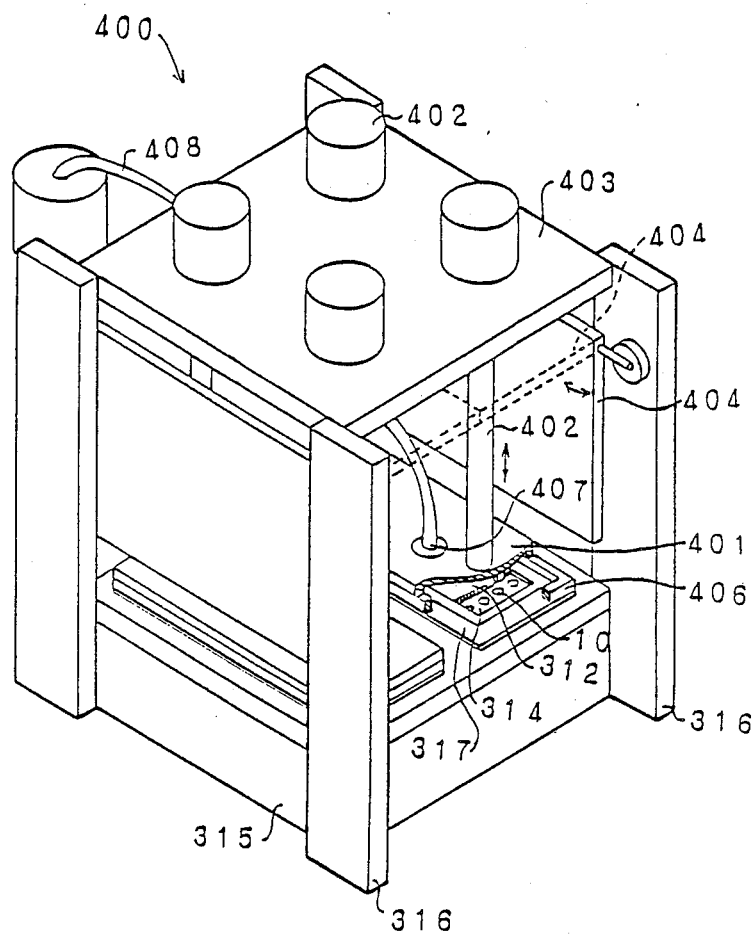
FIG. 27 is a perspective view of a degasificater according to the second embodiment of this invention.
Figure 28:
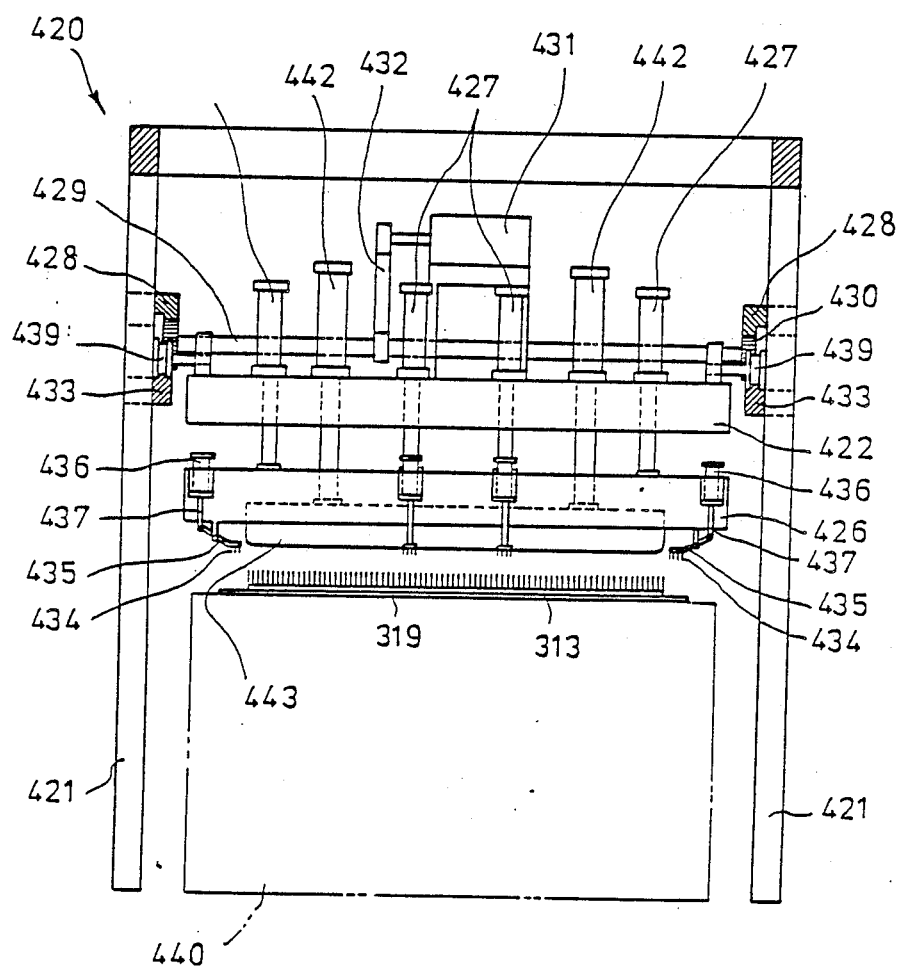
FIG. 28 is a front elevation of a fabric mat supply device of the apparatus according to the second embodiment of this invention.
Figure 29:
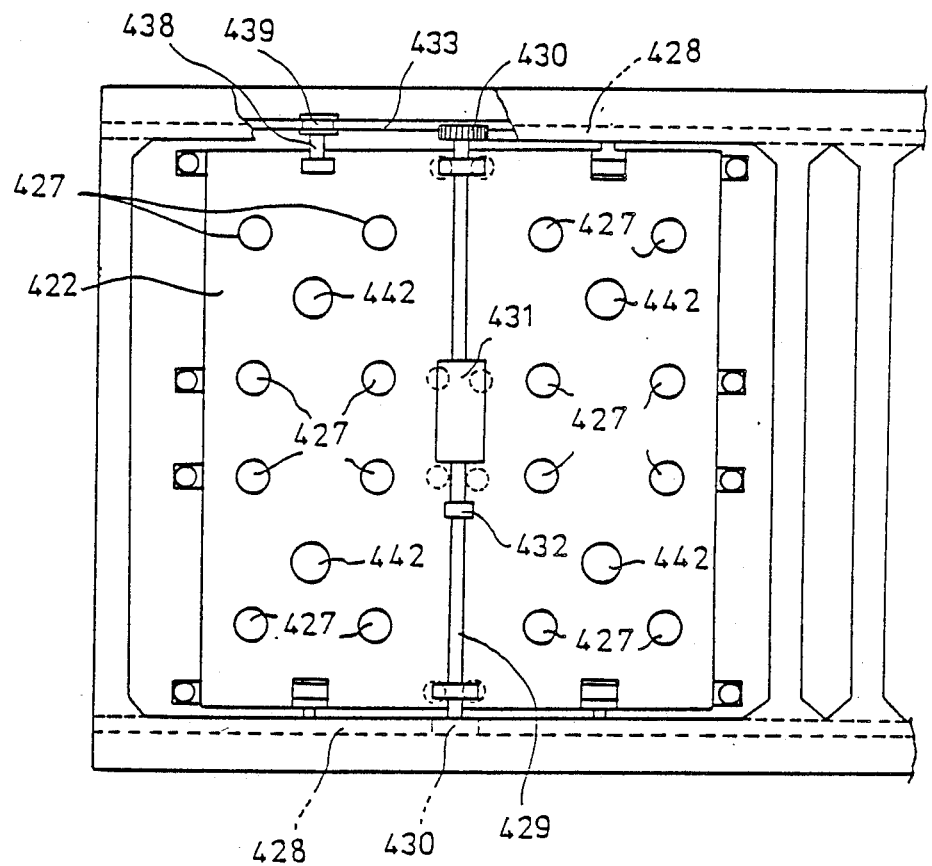
FIG. 29 is a plan view of the fabric mat supply device according to the second embodiment of this invention.
Figure 30:
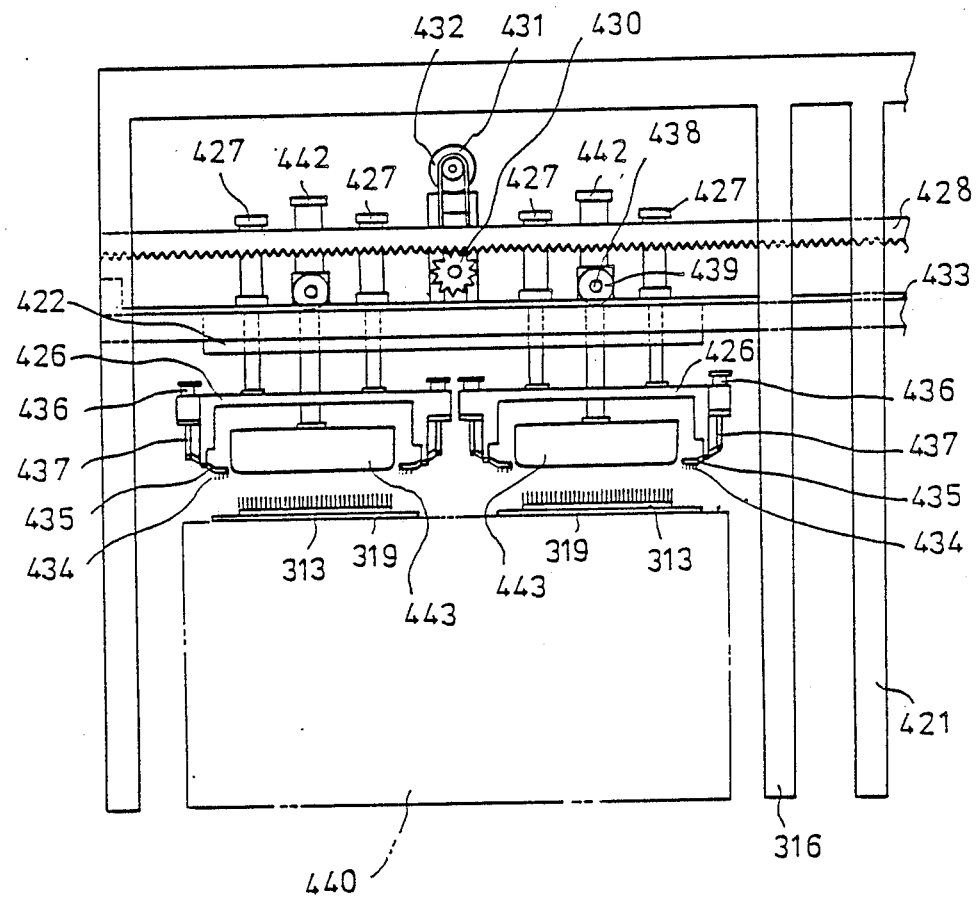
FIG. 30 is a side view of the fabric mat supply device according to the second embodiment of this invention.
Figure 31:
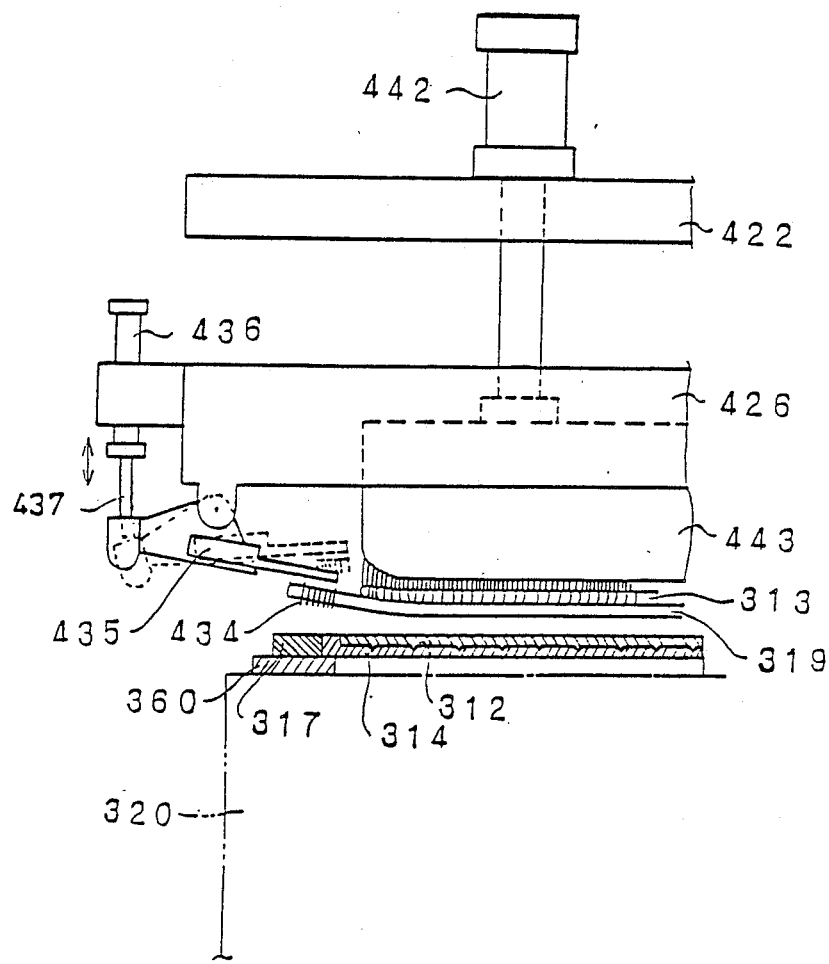
FIG. 31 is a partially enlarged side elevation of the fabric mat supply device according to the second embodiment of this invention.
Figure 32:
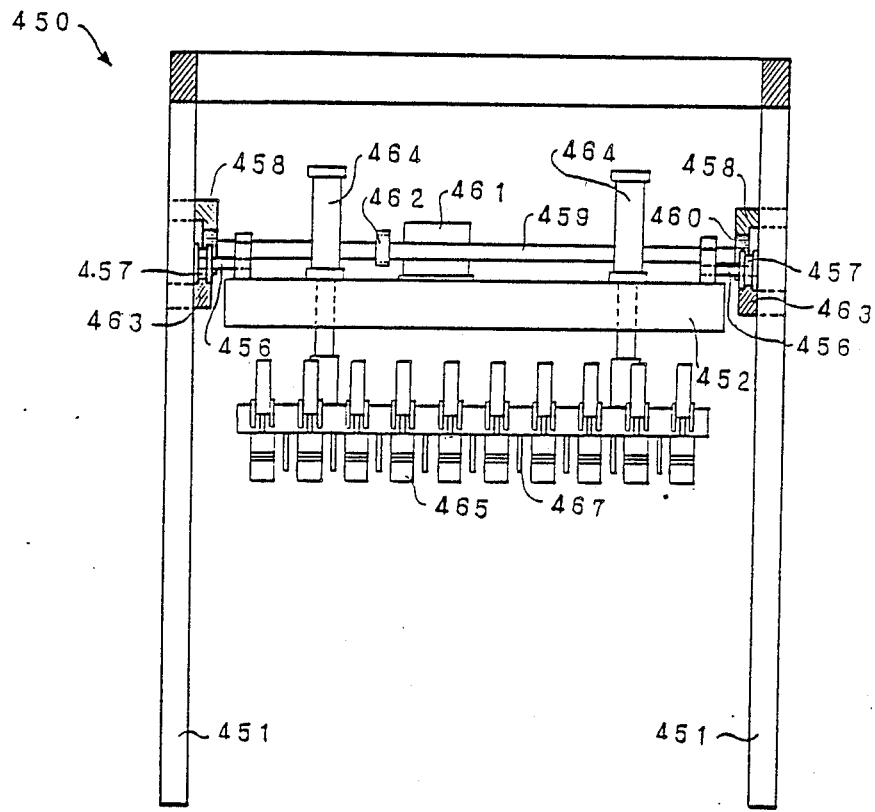
FIG. 32 is a front elevation of a removing device of the apparatus according to the second embodiment of this invention.
Figure 33:
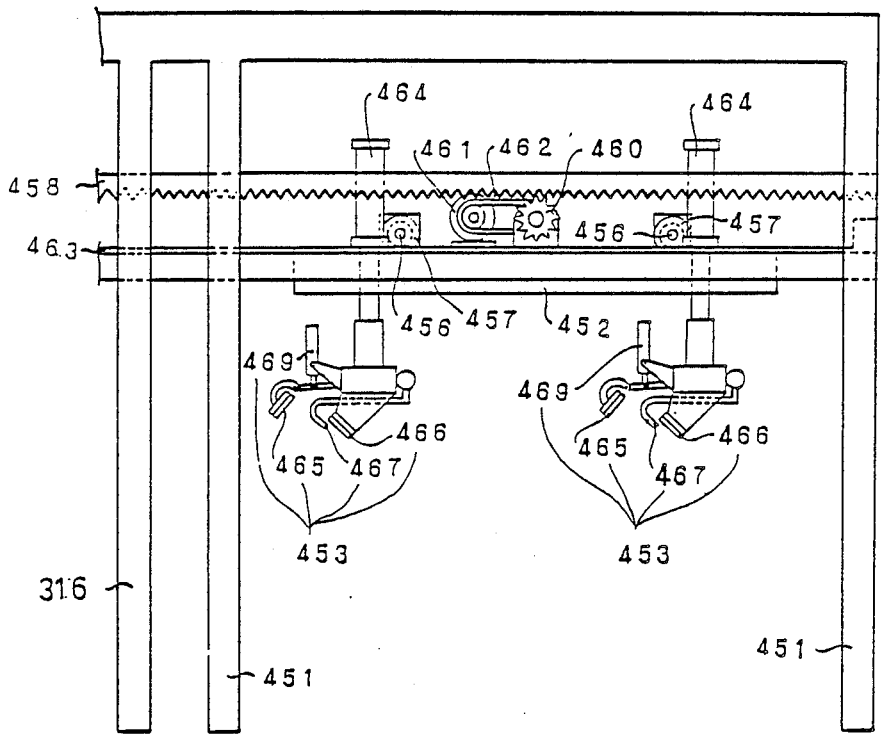
FIG. 33 is a side elevation of the removing device of the apparatus according to the second embodiment of this invention.
Figure 34:
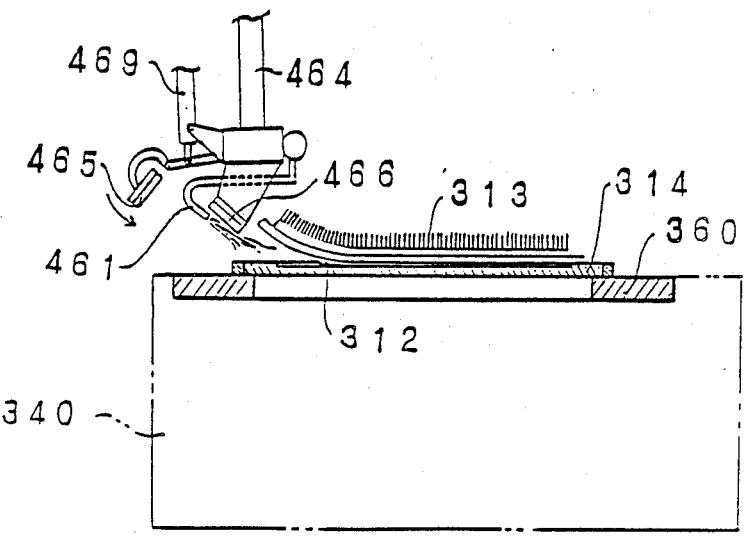
FIGS. 34 and 35 are partially enlarged side elevations respectively showing the process that the removing device removes the fabric mat according to the second embodiment of this invention.
Figure 35:
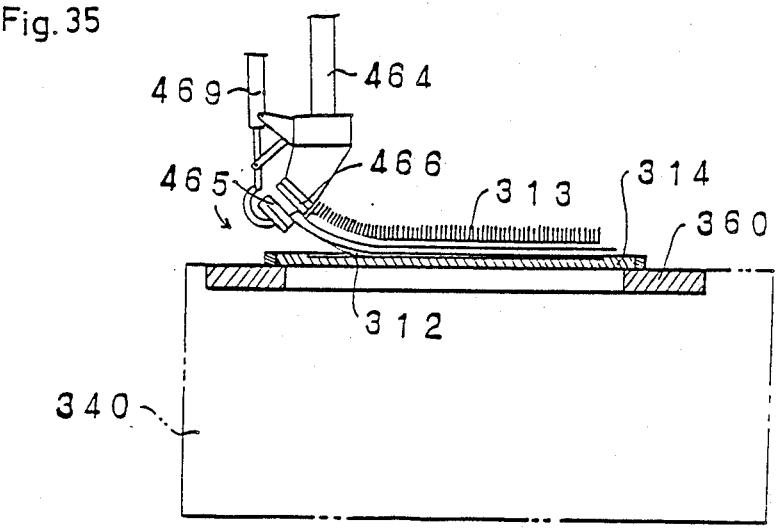

Referring to FIG. 27, the degasificater (400) is provided so that two box-shape vacuum pads (401) align and cover over the upper surface of the metal mold (314). Above these vacuum pads (401) are provided elevation cylinders (402). These elevation cylinders (402) are mounted onto a rectangular over-plate (403) which is supported by the supporting frame (316) provided on both side frame (316). Two water-proof covers (404) for protecting the vacuum pads (402) from the downward are rotatably mounted to the rectangular over-plate (403).

Each vacuum pad (401) is trapezoid shape which abuts on the two opposing mounting frames (317) of the respective metal molds (314) mounted on the shifting table (360), and the lower periphery of the vacuum pad (401) is sealed by a rubber packing (406). Each vacuum pad (401) define two air inhaling holes (407) on the upper surface of each vacuum pad (401). Each of the air inhaling holes (407) is fitted one end of each hose (408), and another end of each hose (408) is connected with a vacuum pump (not shown).

After the resin apply device applies resin (312) onto the metal mold (314), the vacuum pad (401) of the degasificater (400) is elevated downward responsive to the movement of the elevating cylinder (402) so that the vacuum pad (401) abuts on the mounting frame to seal to the mounting frame of the metal mold (314).

Air froth in the vacuum pad (401) is degasificated by the vacuum pump (not shown) for eliminating air froth in the resin (312) and air existing between the metal mold (314) and the resin (312), thus completely filling the resin (312) even in the tapered small holes (10) formed on the metal mold (314). According to the structure as mentioned above, the slip-proof protrusions extending from the rear surface of the vehicle mat are capable of being formed without fail. Furthermore, creases formed on the synthetic resin at the rear surface of the fabric mat and pealing off of the fabric mat from the synthetic resin are both prevented.

In C zone is provided a fabric mat supply device for moving in and out over the metal mold heater provided in A zone and for pressure bonding the fabric mat with the resin in the metal mold while pulling the fabric mat.

The fabric mat supply device (420) as above has a structure illustrated in FIGS. 21 thru 23, and FIGS. 28 thru 31 in which the resin apply device in B zone applies the resin to the metal mold, and the degasificater in B zone fills the applied resin completely in the metal mold, and the shifting table shifts to the position right above the metal mold heater provided in A zone for placing the fabric mat onto the resin which is heated for a predetermined time period at a predetermined preset temperature and changed into semi-gel condition by the metal mold heater for pressure bonding the fabric mat with the semi-gel resin.

The fabric mat supply device (420) as above includes four supporting frames (421) upstanding parallel to each other, and an inner frame (422) formed inside the supporting frame (421). The inner frame (422) has a plate-like structure. To the inner frame (422) is provided an elevation cylinder (427) including retaining pawls (435) engageable with four end edges of the fabric mat (313) for elevating the lower frame (426) and a pressurizing cylinder (442) for elevating a head (443) so as to pressurize the fabric mat (313).

To the upper surface of the inner frame (422) is mounted a driving motor (431). To both end edges on the upper surface of the inner frame (422) are fixed rotating shafts (429), and the driving motor (431) is connected with the rotating shaft (429) through chains (432). Each end surface of the rotating shaft (429) is provided a pinion (430) for transmitting the driving force of the driving motor (431) to the rotating shaft (429) through chains (432), thus rotating each pinion (430).

To each of these pinions (430), a rack (428) is engaged to fit in the position parallel to the supporting frame (316) and (421) transversing from A to C zones, and then the inner frame (422) provided with racks on both ends of the upper surface laterally moves in A and B zones responsive to the rotation of pinions (430). Furthermore, both side portions on the upper surface of the inner frame (422) is provided a pair of shafts (438) respectively, and a sliding roller (439) is mounted to each of the shafts (438). The sliding roller (439) slides on the rail (433) mounted to the supporting frames (316) and (421) located parallel to the racks (428).

A plurality of needles (434) aligned to each other integrally form a brush like pawl (435) and each brush like pawl (435) is fitted to each of the four edges of the lower frame (436) provided in the position substantially lower than the inner frame (422). To the base portion of each brush-like pawl (435) is connected a shaft (437) of a rotating cylinder (436) functioning to rotates pin projections. Each pawl (435) rotates outwardly in accordance with the contraction and expansion of the air in the rotating cylinder (436). As a result, four pawls (435) rotate to impale the four corners of the base cloth (319) forced out at the peripheral portion of the fabric mat (313) placed on a work bench (440).

The lower frame (443) is lifted by the elevation cylinder (427) in the condition that the pawls (435) impale the four corners of the base cloth (315) of the fabric mat (313) placed on the work bench (440). The fabric mat (313) is laterally moved to the position right above the resin filled in the metal mold (314), and then the fabric mat (313) is placed onto the resin (312) by the elevation cylinder (427).

A head (443) of flat plate-like structure for pressurizing on the upper surface of the fabric mat (313) is mounted to the pressurizing cylinder (442) which is mounted to the inner frame (422). The head (443) and the above-mentioned pawl (435) integrally pressurizes the fabric mat (313) to bond the fabric mat (313) with the resin (312) in semi-gel condition (312), while pulling the fabric mat (313) for completely depositing the fabric mat (313) with the semi-gel resin in the state with no gap therebetween.

For changing the semi-gel resin in the complete gel condition, after the semi-gel resin is completely deposited with the fabric mat, heat is again applied to the semi-gel resin by the metal mold heater. After the heat is applied sufficiently to the semi-gel resin, the shifting table moves to B zone above the metal mold cooler so as to cool down the metal mold for obtaining the rubber like gel-condition of the resin.

In D zone is provided a removing device for removing the fabric mat from the metal mold, after the fabric mat is finished to be backed up by the resin.

Referring to FIGS. 21 thru 23 and FIGS. 32 thru 35, the removing device (450) includes: four supporting frames (451) upstanding parallel to each other; an inner frame (452) provided inside the supporting frames (451); and a clamp (453).

The inner frame (452) has a plate like structure.

A driving motor (461) is provided on the upper surface of the inner frame (452). A rotating shaft (459) is fixed to each one of the both end edges of the upper surface of the inner frame (452), and chains (462) are used to connect between the driving motor (461) and the rotating shafts (459). To both ends of the rotating shaft (459) are fitted pinions (460) respectively, and then driving force of the driving motor (461) is transmitted to the rotating shaft (459) through chains (462) for rotating pinions (460).

The racks (458) respectively provided on the supporting frames (316) (451) transversely between B and D zones are engaged to fit to the pinions (460). Responsive to the movement of pinions (460), the inner frame (452) whose end edges on the upper surface are connected to the rack (457) starts to move laterally within B and D zones. A pair of shafts (456) are respectively provided on both sides of the upper surface of the inner frame (452) in the manner that the shafts are protruded from the frame (452) and a sliding roller (457) is attached to each one of the shaft (456). The sliding roller (547) slides onto the rail (463) which is mounted to the supporting frame (316) (451) parallel to the above-mentioned racks (458).

A clamp (453) is secured to the nose end of the shaft (464) of each elevating cylinder (464) which is fixed to the inner frame (452).

Each clamp (453) includes a plurality of clamping pawls (465) aligned facing the shifting table (360) below the inner frame (452), a plurality of supporting plates (466) for supporting the fabric mat (313) by clamping the end edge of the fabric mat (313) when the clamp rotates, an air nozzle (467), a cylinder (469) whose nose end of the shaft (468) is fitted to the base portion of the clamp (465).

A removing device (450) transports the fabric mat (313) finished to be backed up with resin (313) to the position right above the metal mold cooler (340) in B zone by carrying with the shifting table (360). The metal mold cooler (340) cools down the fabric mat finished to be backed up with a semi-gel resin for obtaining the complete gel condition of resin. After that, the driving motor (461) of the inner frame (452) is driven for laterally moving the inner frame (452) onto the fabric mat (313) placed on the shifting table (360).

The elevation cylinder (464) is expanded for moving downward the clamping device (453) provided below the inner frame (452), and then air is injected from the air nozzles (467) for peeling off one end edge of the base cloth (319) from the fabric mat (313). In the meantime, the clamping pawl (465) is rotated in the direction shown by an arrow in the figure for clamping the peeled one end of the fabric mat (313) between the clamping pawls (465) and the supporting plate (466). As a result, the clamping device (453) clamping the fabric mat (313) is elevated and the inner frame (452) again moves in the lateral direction for moving the fabric mat (313) to the position right above a table lifter (not shown).

A sensor (not shown) is provided between the supporting plates (466) included in the plurality of the supporting plates (466) of the clamping device (453) for repeating the removing action of the fabric mat (313) until the clamping device clamps the fabric mat (313) perfectly.

Figure 36:
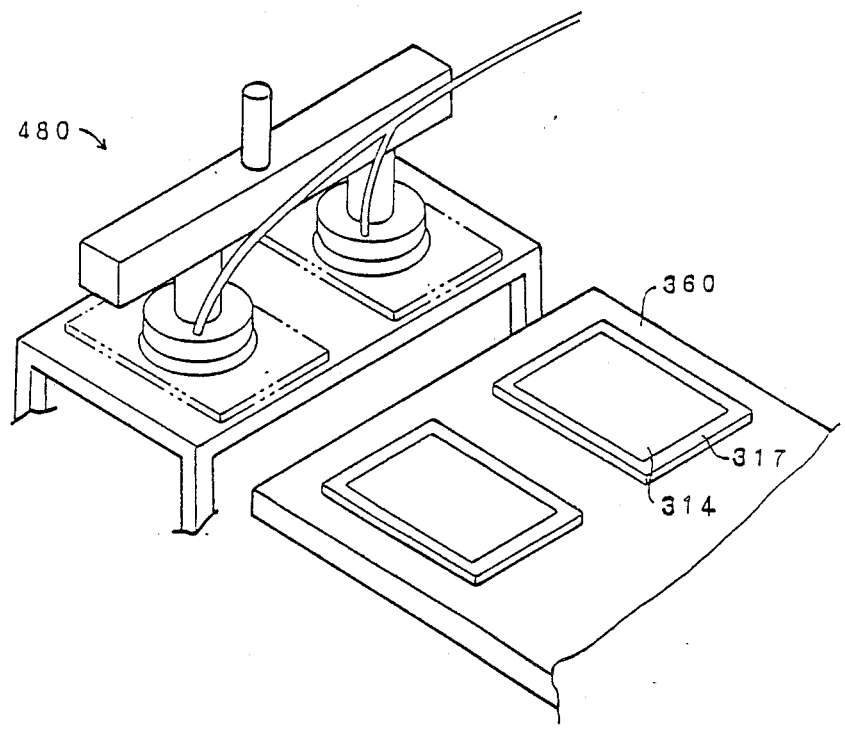
FIG. 36 is a perspective view of the metal mold supply device according to the second embodiment of this invention.

Referring to FIG. 36, the metal mold replacing device (480) is provided for replacing the metal mold (314) on the shifting table (360) depending on the size of the vehicle mat desired to be produced.

In the vehicle mat backing up apparatus (311) according to the second embodiment of this invention, each device may be operated independently, namely, the apparatus may be operated in the manner that simultaneously when a resin supply device and a degasificater apply and fill the resin to the metal mold in B zone, the metal mold heater (453) heats to change the resin applied to the metal mold on the lower shifting table to semi-gel condition and the fabric mat supply device supplies the fabric mat for heating the resin for a predetermined time period by the metal mold heater (453) in A zone. After the operation as above, the upper shifting table is shifted to A zone, while the lower shifting table is shifted to B zone. In A zone, heating of resin and supplying of the fabric mat are performed in the manner as mentioned above. In B zone the cooling and removing operations of the resin are performed by the metal mold cooler and the removing device respectively. The apparatus programmed to be controlled as above by a computer realizes enhanced working efficiency of the vehicle mat backing up operations. Furthermore, when the required amount of products are few, the apparatus may be controlled by starting each device at each production process.

Figure 37:
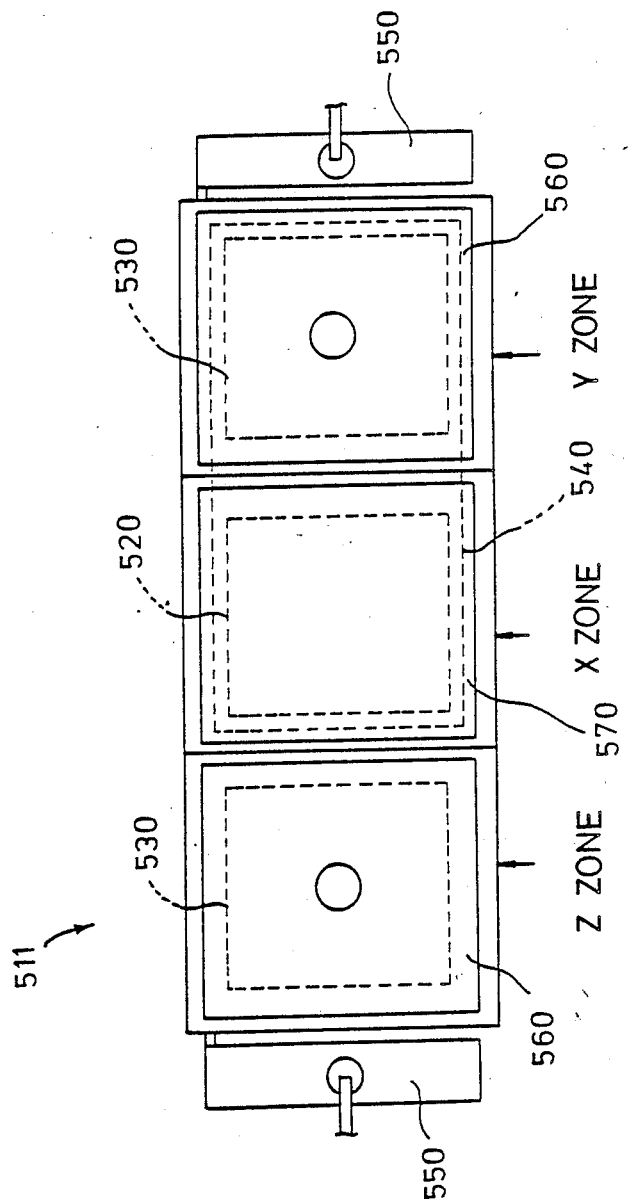
FIG. 37 is a plan view showing the entire parts of an apparatus according to a third embodiment of this invention.
Figure 38:
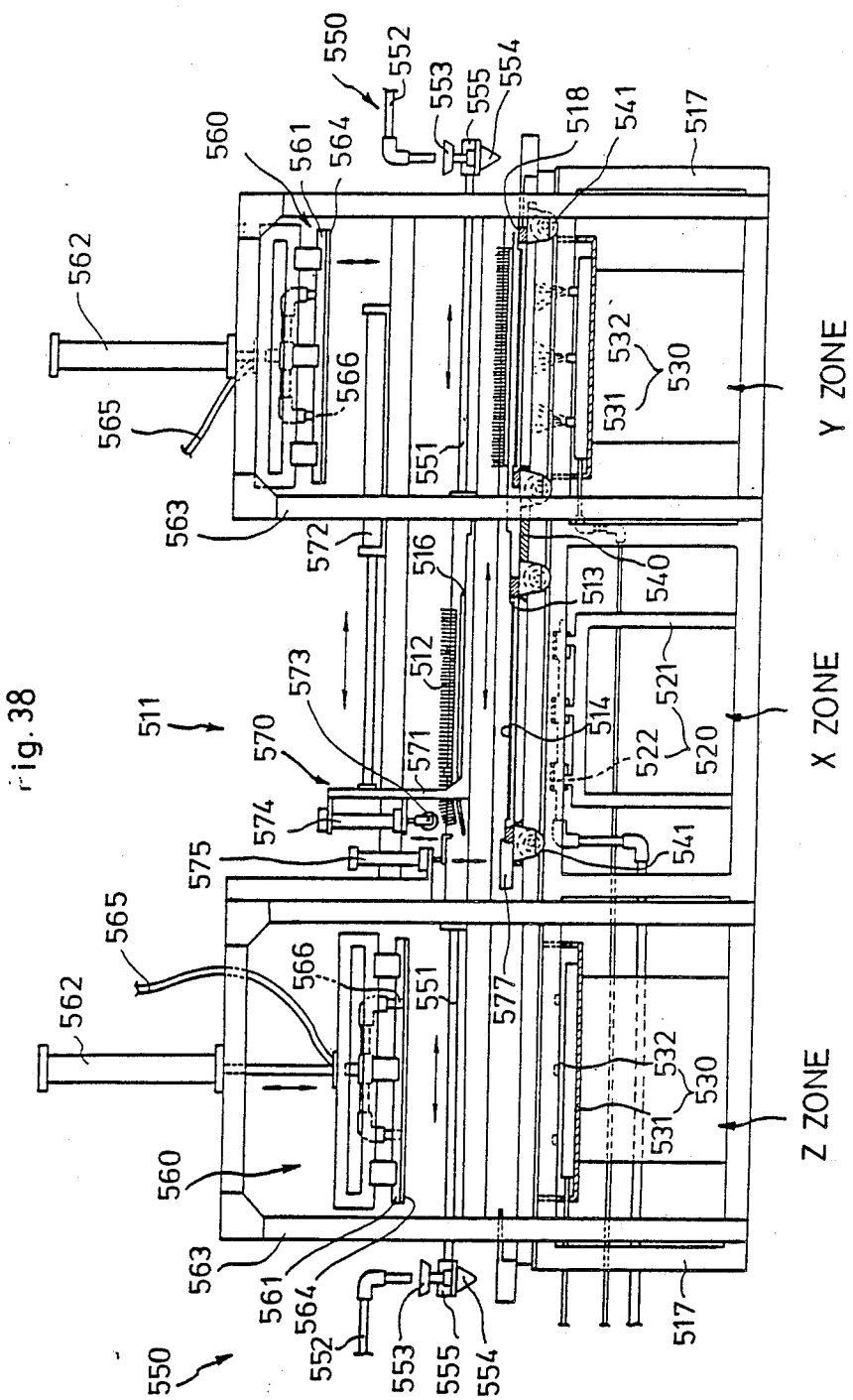
FIG. 38 is a side elevation of the apparatus according to the third embodiment of this invention.
Figure 39:
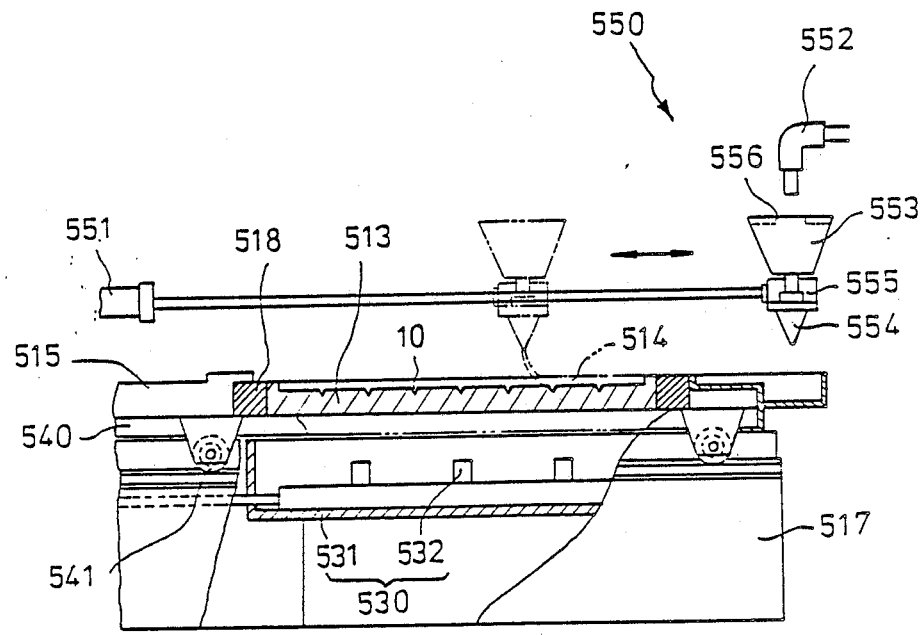
FIG. 39 is a partially enlarged cross-section of the apparatus showing a metal mold cooler for cooling a metal mold, a resin applying device, and a shifting table according to the third embodiment of this invention.
Figure 40:
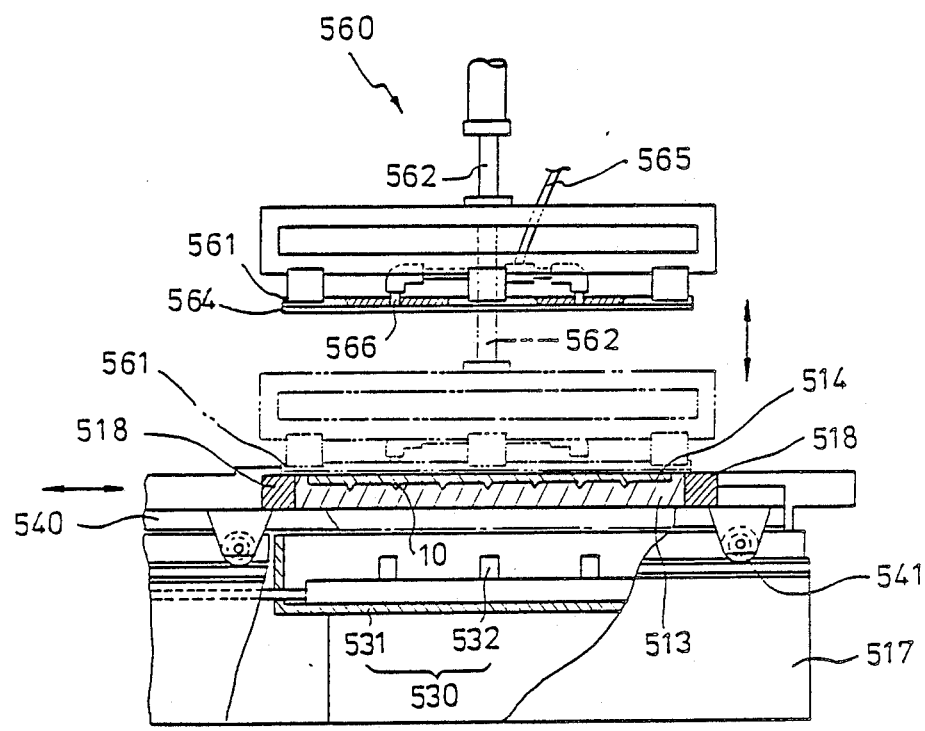
FIG. 40 is a partially enlarged cross-section of the apparatus including a metal mold cooler, a degasificater and a shifting table according to the third embodiment of this invention.
Figure 41:
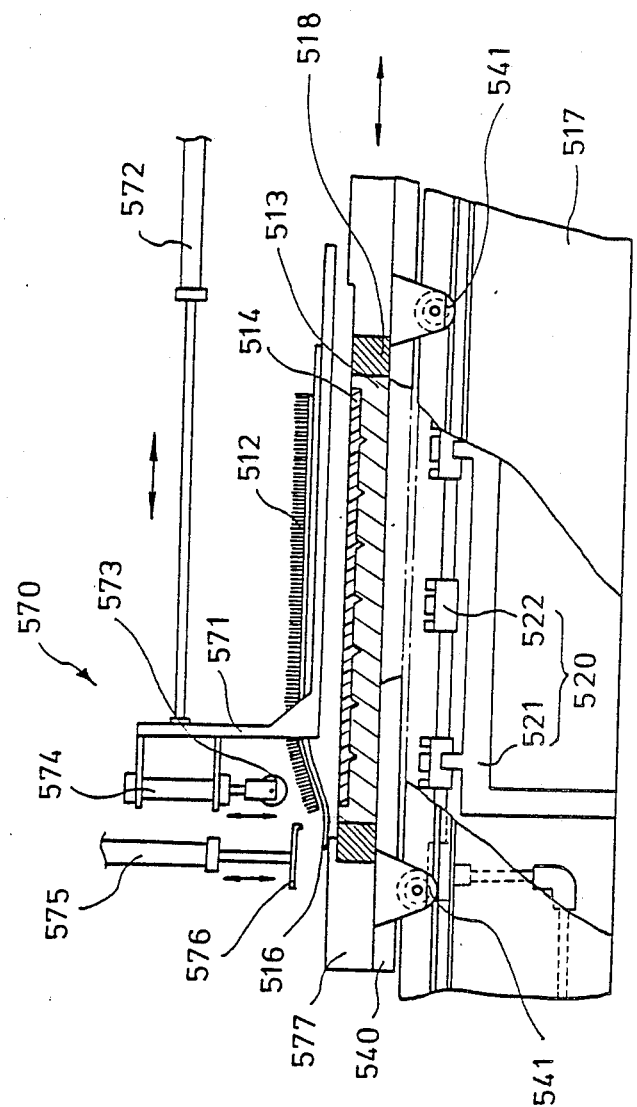
FIG. 41 is a partially enlarged cross-section of the apparatus including a shifting table, a heater for heating a metal mold, and a fabric mat feeding device according to the third embodiment of this invention.
Figure 42:
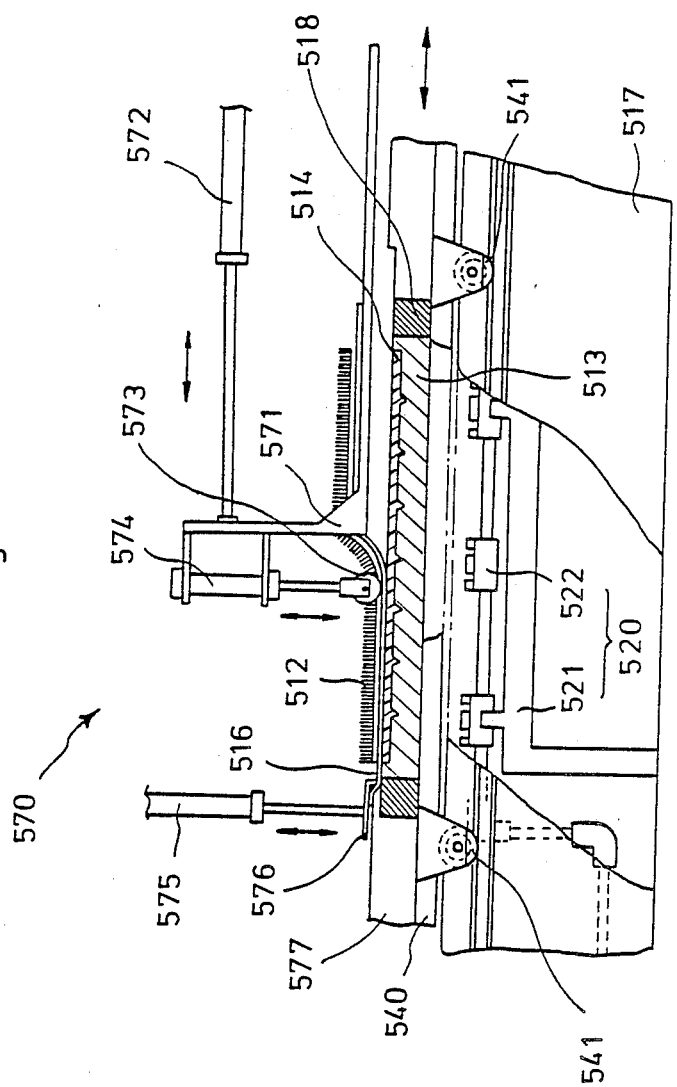
FIG. 42 is a partially enlarged cross-section showing the manner that the fabric mat supply device supplys the fabric mat to synthetic resin according to the third embodiment of this invention.
Figure 43:
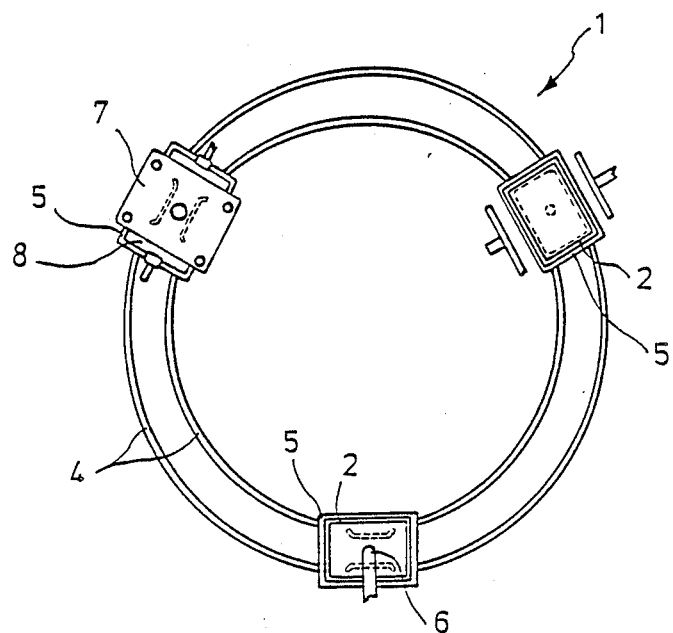
FIG. 43 is a plan view of the apparatus for backing up the vehicle mat according to the prior art.
Figure 44:
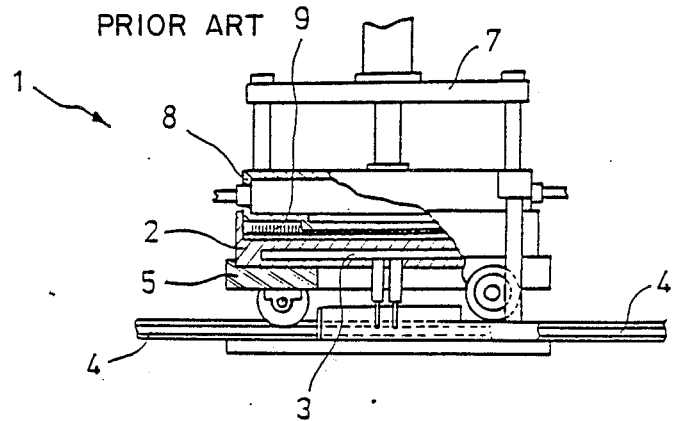
FIG. 44 is a side elevation of the apparatus for backing up the vehicle mat according to the prior art.

The apparatus for backing up vehicle mat according to the third embodiment of this application is described in detail hereinunder on the basis of the drawings. FIG. 37 is a front elevation showing the general construction of the apparatus.

Referring to FIGS. 37 thru 42, the apparatus (511) for backing up a vehicle mat includes a metal mold heater (520) at the center of the apparatus, a metal mold cooler (350), a shifting table (540), a resin apply device (550), a degasificater (560), and a fabric mat supply device (570) in the upper portion or adjacent the metal mold heater (520).

The vehicle mat backing up apparatus (511) as above is divided into three parts as far as function is concerned. Specifically, X zone is an area where a metal mold heater (520) is provided, and Y zone is an area where one metal mold cooler (530) is provided beside the metal mold heater (520), and Z zone is an area where another metal mold cooler (530) is provided. The metal mold heater (520) and the pair of the metal mold coolers (530) are provided interior of the supporting base (517) located along X, Y, and Z zones. Inside the supporting base (517) In X-Y or X-Z zone is placed a shifting table (540) formed to a size sufficient to cover over the metal mold heater (520) and either one of the metal mold cooler (530) and the shifting table (540) makes reciprocating movement in the lateral direction on the surface of the supporting base (517). In the outer side portions of the metal mold coolers (530) (530) are respectively provided a resin applying device (550). In the side portions above the metal mold coolers (530) respectively in Y and Z zones are provided degasificaters (560) both of which enable movement in both upward and downward directions.

Above the metal mold heater (520) in X zone is provided a fabric mat supply device (570) which moves in and out above the metal mold heater (520) and which pressurizes the fabric mat (512) to bond with the resin (514) onto the shifting table (540) carrying the applied resin (514).

As shown in FIGS. 37 thru 42, the metal mold heater (520) in X zone includes a frame (521) secured onto the concrete base, and a gas burner (522) provided inside the frame (521). In this embodiment, the metal mold heater (520) is regulated to obtain the surface temperature of about 180° C. at the resin (514) applied to the metal mold (513) on the shifting table (540).

Furthermore, a gas-pipe type gas burner (522) is adopted in this embodiment. A duct (not shown), to which a sintered blower and an exhaust fan is mounted, is positioned outwardly from the metal mold heater (520). When a shifting table (540) shifts to the position right above the metal mold heater (520), heat is directly applied from beneath the shifting table (540) to the metal mold (513) to which resin (514) is applied and which is mounted on the shifting table (540) so as to change the resin (514) from the sol to gel condition. A radiation thermometer (not shown) is provided above the metal mold heater (520) for detecting the surface temperature of the resin (514) filled inside the metal mold (513). If the surface temperature is detected below 180° C. on the basis of the signal transmitted from the radiation thermometer (not shown), heat is further applied to the resin (514). On the contrary, if the surface temperature of the resin is above 180° C., the resin (514) is cooled down. Accordingly, thermo-adjustment of the resin is performed in the manner as mentioned above.

In this embodiment, the set temperature of the radiation thermometer (not shown) is not limited to 180° C. but is variably determined depending on the kind of resin or the material of the fabric mat (512) into consideration.

Referring to FIGS. 37 thru 42, in Y and Z zones of the metal mold coolers (520) are respectively provided a pair of metal mold coolers (530) (530). Each of the metal mold coolers (530) includes a water tank (531) secured on the concrete base, and shower nozzles (532) protruded from inside the water tank (531). When the shifting tables (540) transport the fabric mat (513) finished to be backed up, while carrying the fabric mat (513) thereon to the position right above the metal mold cooler (530), the above-mentioned shower nozzles (532) inside the water tank (531) inject coolant to the bottom surface of the metal mold (513) mounted on the shifting table (540) for cooling the metal mold (513).

Referring to FIGS. 37 thru 42, the shifting table (540) is formed as a size sufficient to covers over the upper surface of the metal mold heater and either one of the metal mold coolers. The shifting table (540) as above includes a detachable metal mold on the upper surface of the shifting table (540), and the shifting table (540) as above reciprocatingly moves in the lateral direction above each device, namely, metal mold heater (520) in X zone and the metal mold coolers (530) (530) respectively in Y and Z zones which correspond to the both sides of the metal mold heater (520) in X zone.

For example, a pair of mounting frames (518) are provided for mounting metal molds (513) to the upper surface of the shifting table (540). While one metal mold (513) mounted inside the mounting frame (518) is heated in X zone, another metal mold (513) is cooled down in Z zone. The inside of the mounting frame (518) defines an aperture (not shown) perforated so that the aperture has a diameter slightly smaller than the size of the metal mold (513). The metal mold (513) which is detachably mounted on the upper surface of the shifting table (540) has a plate-like structure having a size of 120 mm by 80 mm by 10 mm by outer dimension, and this plate is formed depending on the size of mat desired to be produced. Such metal mold (513) includes many modifications depending on the size of the vehicle mat needed to be produced. Furthermore, the metal mold (513) is detachably mounted inside the above-mentioned mounting frame (518) as occasion demands. In this embodiment according to the present invention, two metal molds (513) having different shape to each other may be mounted over the shifting table (514) for producing at most two different vehicle mats at one production process.

Two pairs of wheels (541) are rotatably supported on both ends of the shifting table (540) respectively. When these two wheels (541) are placed onto the above-mentioned supporting base (517), a driving cylinder (not shown) secured to the side wall of the shifting table (540) drives shifting table (540) to slide laterally onto the supporting base (517).

In the outer side portion of the metal mold coolers (530) (530) respectively provided respectively in Y or Z zone are provided respectively the resin apply devices (550).

As shown in FIGS. 37 thru 42, each resin apply device (550) applies the resin (514) to the metal mold (513), coming in and out over in the direction to Z zone indicated by an arrow in the figures when the shifting table (540), to which the metal mold (513) is mounted, shifts to the position right above the metal mold cooler (530) provided in Y or Z zone.

The resin apply device (550) as above defines a hole (556) for supplying the resin (514) from the resin supply pipe (552) located at the upper portion of the resin tank (553). The resin tank (553) includes a plurality of nozzles (554) for applying the resin (514) to the metal mold (513) at the bottom portion of the resin tank (553). The nozzles (554) as above are controlled to open and close by the electromagnetic valve (555). The resin tank (553) moves in the lateral direction responsive to the contraction and expansion of air in the elevating cylinder (551) mounted in the side portion of the resin tank (553). The electromagnetic valve (555) is opened to apply the resin (514) in the resin tank (553) to the metal mold (513) by utilizing gravitation.

The resin tank (553) accomodates plastic sol made by compounding vynyl chloride with 30–35 percentages of plasticizer such as 2-octylehexylephtalete or n-octylephtalete.

The amount of applied resin (514) is regulated by the electromagnetic valve (555) provided beneath the resin tank (553).

Besides the resin apply device (550), a pair of degasificaters (560) (560) are provided respectively above the side portions of the metal mold coolers (530) (530) respectively provided in Y or Z zone.

The degasificater (560) is for filling the resin applied by the resin apply device (550) in the metal mold (513). The metal mold (513) defines a plurality of tapered small apertures (10) for forming the slip-proof protrusions on the vehicle mat, and then the resin (514) is required to be filled in the apertures. As shown in FIGS. 37 thru 42, degasificaters (560) respectively in Y and Z zones are provided on the supporting base (517) so that box-shaped vacuum pads (561) cover over the upper surface of the metal mold (513). Above the vacuum pads (561) are provided elevation cylinders (562) respectively, both elevation cylinders (562) are mounted to the supporting frame (563) upstanding from the supporting base (517). Each vacuum pad (561) is mounted in the position to abut on the mounting frame (518) of the metal mold (513) placed on the shifting table (540) and a rubber packing (564) is sealed at the lower peripheral portion of each vacuum pad (561). On the upper surface of each vacuum pad (561) are formed a plurality of air intake holes (566). One end of a hose (565) is fitted to each air inhaling hole (566) of the vacuum pad (561), while another end of each hose (565) is connected to a vacuum pump (not shown).

After the resin (514) is applied to the metal mold (513) by the resin apply device (550), the vacuum pad (561) of the degasificater (560) lowers its position responsive to the movement of the elevation cylinder (562) until each vacuum pad (561) abuts tightly on the mounting frame (518) of the metal mold (513). Air in the vacuum pad (561) is discharged by a vacuum pump (not shown) to remove the air froth in the resin (514) and air existing between the metal mold (513) and the resin (514). Because of this, resin is capable to be filled even in the tapered small hole (10) perforated on the metal mold (513). Accordingly, slip-proof protrusions are capable to be formed on the rear surface of the vehicle mat without fail, and cracks which tend to be formed on the rear surface of the vehicle mat (512) and peeling off of the vehicle mat (512) from the synthetic resin (514) are compatibly prevented.

In X and Y zones are respectively provided fabric mat supply devices (570) coming in and out above the metal mold heater and pressurizing to bond the resin carried by the shifting table with the fabric mat.

As shown in FIGS. 37 thru 42, after the resin applying device (550) (550) in Y or Z zone applys resin (514) within the metal mold (513) placed on the shifting table (540) and either degasificater (560) (560) in Y or Z zone fills the applied resin (514) in the metal mold (513) mounted on the shifting table (540), the fabric mat supply device (570) operates the shifting table (540) to move one of the metal mold (513) filled with resin to the position right above the metal mold heater (520) in X zone for heating the metal mold (513) for a predetermined time period at a predetermined temperature by the metal mold heater (520) and pressure bonding the fabric mat (512) with the upper surface of the semi-gel resin (514).

In the fabric mat supply device (570) as above, the shaft of the lateral moving cylinder (572) positioned in the side portion of the supporting base (517) is connected with a fabric mat setting bench (571) so that the setting bench (571) reciprocatingly moves on the metal mold heater (520) in X zone or on the metal mold cooler (530) in Y zone responsive to contraction and expansion of air in the laterally moving cylinder (572). In this embodiment, however, the fabric mat setting bench (571) is ordinarily regulated to be positioned in X zone. When the fabric mat (512) is supplied to the resin (514), the fabric mat setting bench (571) shifts to Y zone. On the fabric mat setting bench (571) as above is placed a fabric mat (512) in the state that the base cloth (517) is forced out from the fabric mat (512) on the peripheral portion thereof. A pressurizing cylinder (574) is connected to one end of the fabric mat setting bench (571). A pressurizing roller (573) extending parallel to the width direction of the above fabric mat (512) is rotatably connected with the axis of the shaft of the pressurizing cylinder (574).

A clamping cylinder (575) is provided in the position parallel to the pressurizing cylinder (574) above the supporting base (517) in X zone.

A L-shaped retaining pawl (576) is formed on the shaft of the clamping cylinder (575) and the retaining pawl (576) fixes the fabric mat (512) by retaining the base cloth (516) by abutting on a clamping plate (577) mounted on the periphery of the shifting table (540). When one metal mold in which the resin (514) is filled and which is mounted on the shifting table (540) moves to the position right above X zone, the base cloth (516) of the fabric mat (572) placed on the fabric mat setting bench (571) in X zone is secured by lowering the position of the clamping cylinder (575) for clamping the base cloth (516) between the retaining pawl (570) secured on the clamping cylinder (575) and a clamping plate (576) provided on the shifting table (540). In the meantime, a pressurizing roller (573) lowers its position for pressurizing to secure the base cloth (516) of the fabric mat (512) responsive to expansion of air in the pressurizing cylinder (571).

Subsequently, the shaft of the laterally moving cylinder (572) is pressed for laterally moving the fabric mat setting bench (571) and the pressurizing roller (573) to the Y zone. Responsive to the lateral movement of both the fabric mat (516) setting bench (571) and the pressurizing roller (573), the fabric mat (512) whose one end of the base cloth (516) is secured onto the shifting table (540), is attached downwardly onto resin (514) of the metal mold (513), while the pressurizing roller (573) moves laterally for pressurizing the fabric mat (512). In this manner, the fabric mat (512) is pressurized to bond with the semi-gel resin (514) by the pressurizing roller (573) and the resin (514) is completely deposited to the rear surface of the fabric mat (512) with no gap therebetween.

After the semi-gel resin (514) is completely deposited to the fabric mat (512) by the fabric mat supply device (570), the fabric mat (512) is heated by the above-mentioned metal mold heater (520) to obtain complete gel condition of the resin (514). After the semi-gel resin (514) is sufficiently heated to obtain gel condition, the shifting table (540) moves to the position right above the metal mold cooler (530) in Y zone and the metal mold (513) is cooled down to change the gel resin (514) to the rubber like gel resin. After the resin (514) is cooled down for a predetermined time period to obtain complete rubber like condition, the fabric mat (512) is removed from the metal mold (513).

In the vehicle mat backing up apparatus (511) as above according to the third embodiment of this invention, the devices may be operated independently of each other. For example, the apparatus for backing up vehicle mat may be operated in the manner that simultaneously when the resin apply device (550) and the degasificater (560) perform applying and filling of the resin (514) to one of the metal mold (513) in Y zone, the metal mold heater (520) heats to change the resin (514) of another metal mold mounted on a lower shifting table (540) to semi-gel condition and the fabric mat supply device (570) supplies the fabric mat (512) for heating the resin (514) for a predetermined time period by the metal mold heater (520) in X zone. After the operation as above, one metal mold (513) is moved to X zone while another one (513) mounted on the shifting table (540) is moved to Z zone. As it is understood from the description hereinabove, X zone is an area where heating of the resin (514) and supplying of the fabric mat (512) are performed, Z zone is an area in which resin application and degasification of the resin are again performed by the resin apply apparatus (550) provided in the outer side portion of the metal mold cooler (530) and a degasificater (560) provided in the side portion above the metal mold cooler (530) respectively, as well as removal of the fabric mat (512) finished to be backed up from the metal mold cooler (530). The apparatus programmed to be operated as above for controlling each device by a computer realizes improved working efficiency. Furthermore, when productivity is not evaluated, the apparatus may be programmed so that only one device is operated at each production process.

Furthermore, in the apparatus for backing up vehicle mat according to the third embodiment of this invention, the laterally or elevationally moving device is not limited to the device explained in the preferred embodiment at all. With respect to the structure of the apparatus for backing up the vehicle mat according to the third embodiment of this invention, further modifications are enabled, for example, two backing up apparatus share one lateral moving cylinder for moving each device of the two backing up apparatus simultaneously responsive to the shaft movement of the lateral moving cylinder, and thus each operation is performed for backing up the vehicle mat. If this structure is adopted for the vehicle mat backing up apparatus, the backing up operation is capable of being performed in the comparatively narrower space at high efficiency.

What is claimed is:

1. A method for backing up vehicle mats comprising the steps of:
   mounting a plurality of detachable metal molds on a turntable having mounting frames;
   applying resin to the metal molds by releasing resin from a tank, transporting the resin through a pipe from the tank to nozzles and injecting the resin from the nozzles into the molds;
   removing air from the resin by sealing a vacuum pad having air intake holes on its upper surface and packing on its lower surface to the mounting frame, and connecting suction hoses from a vacuum pump to the vacuum pad;
   heating the resin in the metal mold by means of a metal mold heater which heats the bottom surface of the metal mold;
   providing a fabric mat on the resin by transporting a fabric mat to the metal mold using conveying means, setting the fabric mat onto the resin using setting means, and pressure bonding the fabric mat to the resin using pressure means;
   cooling the resin in the metal mold by means of a metal mold cooler which cools the bottom surface of the metal mold and;
   removing a finished vehicle mat from the mold by clamping the finished fabric mat with a clamping device having rotatable clamping pawls and injecting air on an outer edge of the clamping pawls by means of air nozzles to peel off an end edge of a base cloth from the finished fabric mat.

2. An apparatus for backing up vehicle mats comprising:
   a turntable having mounting frames on which a plurality of detachable metal molds are mounted;
   a means for applying resin to the metal molds comprising nozzles, for injecting resin into the molds, a tank for storing the resin, a tap for releasing the resin from the tank, a means for regulating the resin tap, and a pipe for transporting the resin from the tank to the nozzles;
   a degasificator, movably mounted to be positionable over the turntable for removing air from the resin comprising a vacuum pump, a vacuum pad having air intake holes on its upper surface and packing on its lower surface for sealing the vacuum pad to the mounting frame; and suction hoses for connecting the air intake holes to the vacuum pump;
   a metal mold heater provided substantially below the turntable for heating the resin in the mold;
   a fabric mat supply device comprising a conveying means for transporting a fabric mat, a setting means for setting the fabric mat onto the resin, and a pressure means for pressure bonding the fabric mat to the resin;
   a metal mold cooler provided substantially below the turntable for cooling the resin in the mold; and
   a means for removing a finished vehicle mat from the mold comprising a clamping device having rotatable clamping pawls for clamping the finished fabric mat, and air nozzles provided on an outer edge of the clamping pawls to inject air to peel off an end edge of a base cloth from the finished fabric mat.

3. An apparatus for backing up vehicle mats comprising:
   a metal mold heater for applying heat to resin in a metal mold;
   a metal mold cooler provided in a position adjacent to the metal mold heater for cooling the resin in the metal mold;
   a shifting table to which a plurality of metal molds are detachably mounted;
   means for moving said shifting table laterally over the metal mold heater and the metal mold cooler;
   a means for applying resin, positioned in a side portion of the metal mold cooler, to apply resin to the metal mold, said means comprising nozzles for injecting resin into the mold, a tank for storing the resin, a tap for releasing the resin from the tank, a means for regulating the resin tap, and a pipe for transporting the resin from the tank to the nozzles;
   a degasificator movably mounted to be positionable over the metal mold cooler for removing air in the resin comprising a vacuum pump, a vacuum pad having air intake holes on its upper surface and packing on its lower surface for sealing the vacuum pad to the mounting frame; and suction hoses for connecting the air intake holes to the vacuum pump;
   a fabric mat supply device comprising means for removing a fabric mat from a workbench and moving said fabric mat to a position directly over the metal mold filled with resin, and a pressure means for pressure bonding the fabric mat to the resin; and
   a removing means for removing the fabric mat from the metal mold, said means comprising a clamping device having rotatable clamping pawls for clamping the finished fabric mat, air nozzles provided on an outer edge of the clamping pawls to inject air to an end of a base cloth from the finished fabric mat, means for moving said device laterally over said metal mold.

4. An apparatus for backing up vehicle mats comprising;
   metal molds, metal mold heaters for heating resin in the metal molds;
   a metal mold heater positioned between the metal mold coolers for heating resin in the metal molds;
   a means for applying resin to the metal molds comprising a resin supply pipe, a tank having a hole at its upper end to receive resin from the resin supply pipe, and nozzles positioned at the bottom end of the tank for releasing the resin into the metal molds, and an electromagnetic valve to control the release of the resin from the tank;
   a degasificator movably mounted to be positionable over an upper side portion of the metal mold cooler for removing the air from the resin comprising a vacuum pump, a vacuum pad having air intake holes on its upper surface and packing on its lower surface for sealing the vacuum pad to the mounting frame, and suction hoses for connecting the air intake holes to the vacuum pump;
   a shifting table to which detachable metal molds are mounted which covers an upper surface of the metal mold heater and either one of two metal mold coolers; and
   a fabric mat supply device which moves laterally over the metal mold heater to position a fabric mat on a mold, and means for exerting pressure to the fabric mat to pressure bond the fabric mat to the resin.

* * * * *